United States Patent
Parastegari et al.

(10) Patent No.: US 12,465,446 B2
(45) Date of Patent: Nov. 11, 2025

(54) STEERABLE VIEWER MODE ACTIVATION AND DE-ACTIVATION

(71) Applicant: Intuitive Surgical Operations, Inc., Sunnyvale, CA (US)

(72) Inventors: Mohammad Sina Parastegari, Campbell, CA (US); Paul G. Griffiths, Santa Clara, CA (US); Brandon D. Itkowitz, San Jose, CA (US); Goran A. Lynch, Oakland, CA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 259 days.

(21) Appl. No.: 18/037,896

(22) PCT Filed: Nov. 23, 2021

(86) PCT No.: PCT/US2021/060603
§ 371 (c)(1),
(2) Date: May 19, 2023

(87) PCT Pub. No.: WO2022/115469
PCT Pub. Date: Jun. 2, 2022

(65) Prior Publication Data
US 2024/0008942 A1    Jan. 11, 2024

Related U.S. Application Data

(60) Provisional application No. 63/118,175, filed on Nov. 25, 2020.

(51) Int. Cl.
*A61B 34/37*    (2016.01)
*A61B 7/00*    (2006.01)
(Continued)

(52) U.S. Cl.
CPC .............. *A61B 34/37* (2016.02); *A61B 17/00* (2013.01); *A61B 34/25* (2016.02); *A61B 90/06* (2016.02);
(Continued)

(58) Field of Classification Search
CPC ......... A61B 34/37; A61B 17/00; A61B 34/25; A61B 90/06; A61B 2017/00216;
(Continued)

(56) References Cited

U.S. PATENT DOCUMENTS

| 5,876,325 A | 3/1999 | Mizuno et al. |
| 6,424,885 B1 | 7/2002 | Niemeyer et al. |

(Continued)

FOREIGN PATENT DOCUMENTS

| WO | WO-2021041249 A1 | 3/2021 |
| WO | WO-2021041253 A1 | 3/2021 |

OTHER PUBLICATIONS

Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.
(Continued)

*Primary Examiner* — Harry Y Oh
(74) *Attorney, Agent, or Firm* — Patterson + Sheridan, LLP

(57) ABSTRACT

Embodiments relate to a computer-assisted robotic system, In some embodiments, the system includes a head input device, the head input device comprising a head input sensor configured to provide head input signals indicative of a an operator's head inputs, and a foot input device comprising a foot input sensor configured to provide foot input signals indicative of the operator's foot inputs. The system further includes a controller, configured to process the head input signals and the foot input signals, and identify, based on the
(Continued)

processed head and foot input signals, that the operator has provided a combination of head and foot inputs corresponding to a steerable viewer mode activation command. The controller is further configured to cause the robotic system to enter a steerable viewer mode in response to identifying that the operator has provided a combination.

23 Claims, 12 Drawing Sheets

(51) Int. Cl.
  *A61B 17/00* (2006.01)
  *A61B 34/00* (2016.01)
  *A61B 90/00* (2016.01)

(52) U.S. Cl.
  CPC ............ *A61B 2017/00216* (2013.01); *A61B 2017/00973* (2013.01); *A61B 2090/065* (2016.02)

(58) Field of Classification Search
  CPC .... A61B 2017/00973; A61B 2090/065; A61B 90/60; A61B 90/37; G05B 2219/35455; G05B 2219/35472; G05B 2219/40195; G05B 2219/40398; G05B 2219/45117; B25J 9/1689

See application file for complete search history.

(56) References Cited

U.S. PATENT DOCUMENTS

| | | |
|---|---|---|
| 8,808,164 B2 | 8/2014 | Hoffman et al. |
| 9,179,832 B2 | 11/2015 | Diolaiti |
| 2016/0183930 A1 | 6/2016 | Herzlinger et al. |
| 2017/0180720 A1 | 6/2017 | Jarc |
| 2018/0092706 A1* | 4/2018 | Anderson ............ A61B 90/50 |
| 2020/0261160 A1 | 8/2020 | Peine et al. |
| 2021/0407309 A1* | 12/2021 | Jarc ......................... H04N 5/76 |
| 2022/0287788 A1* | 9/2022 | Parastegari ............ A61B 34/37 |

OTHER PUBLICATIONS

International Preliminary Report on Patentability for Application No. PCT/US2021/060603 mailed Jun. 8, 2023, 07 pages.
International Search Report and Written Opinion, Application No. PCT/US2021/060603 Dated Mar. 1, 2022.

* cited by examiner

STEERABLE VIEWER MODE ACTIVATION AND DE-ACTIVATION

BACKGROUND

More and more devices are being replaced with computer-assisted electronic devices. This is especially true in industrial, entertainment, educational, and other settings. As a medical example, the hospitals of today have large arrays of electronic devices being found in operating rooms, interventional suites, intensive care wards, emergency rooms, and/or the like. Many of these electronic devices may be capable of autonomous or semi-autonomous motion. It is also common for personnel to control the motion and/or operation of electronic devices using one or more input devices located at an operator input system. As a specific example, minimally invasive, robotic telesurgical systems permit surgeons to operate on patients from bedside or remote locations. Telesurgery refers generally to surgery performed using surgical systems where the surgeon uses some form of remote control, such as a servomechanism, to manipulate surgical tool movements rather than directly holding and moving the tools by hand.

When an electronic device is used to perform a task at a worksite, one or more imaging devices (e.g., an endoscope, an optical camera, and/or an ultrasound probe) can capture images of the worksite that provide visual feedback to an operator who is monitoring and/or performing the task. The imaging device(s) may also be controllable to update a view of the worksite that is provided, via a display unit, to the operator. For example, the imaging device(s) could be attached to a repositionable structure that includes two or more links coupled together by one or more joints, where the repositionable structure can be moved (including through internal reconfiguration) to update a position and/or orientation of the imaging device at the worksite. In such a case, movement of the imaging device(s) may be controlled by the operator or another person or automatically, and enable the view of the worksite to be changed.

An approach for controlling an imaging device is to move the imaging device in response to the motion of a display unit. For example, the head or eye motion of an operator can be tracked via a viewing system, mapped to commanded motion for an imaging device, and used to control the motion of the imaging device.

However, the operator may want input to the display unit to move the display unit some of the time, and not during other times. Accordingly, improved methods and systems for controlling repositionable imaging devices are desirable.

SUMMARY

One or more embodiments of the present application relate to systems and methods for activating a steerable viewer mode of a computer-assisted robotic system. In one example, a system is presented. The computer-assisted robotic system includes a head input device configured to receive head inputs provided by a head of an operator of the robotic system, the head input device comprising a head input sensor configured to provide head input signals indicative of the head inputs. The computer-assisted robotic system further includes a foot input device configured to receive foot inputs provided by a foot of the operator of the robotic system, the foot input device comprising a foot input sensor configured to provide foot input signals indicative of the foot inputs, and a controller communicatively coupled to the head input device and the foot input device. The controller is configured to process the head input signals and the foot input signals, identify, based on the processed head and foot input signals, that the operator has provided a combination of head and foot inputs corresponding to a steerable viewer mode activation command, and cause the robotic system to enter the steerable viewer mode in response to identifying that the operator has provided the combination. In the steerable viewer mode, the robotic system may cause motion of a viewer or a tool in response to additional head input signals indicative of additional head inputs provided by the head, wherein the viewer is configured to display an image viewable by the operator, and wherein the tool that is supported by the robotic system.

In another example, a method is presented. The method includes receiving head input signals indicative of head inputs provided by an operator of the robotic system to a head input device, and receiving foot input signals indicative of foot inputs provided by the operator of the robotic system to a foot input device. The method further includes processing the head input signals and the foot input signals, identifying, based on the processed head and foot input signals, that the operator has provided a combination of head and foot inputs corresponding to a steerable viewer mode activation command, and causing the robotic system to enter the steerable viewer mode in response to identifying that the operator has provided the combination.

In yet another example, a non-transitory machine-readable medium is provided. The non-transitory machine-readable medium includes a plurality of machine-readable instructions executed by one or more processors associated with a robotic system, the plurality of machine-readable instructions, when executed, causing the one or more processors to receive head input signals indicative of head inputs provided by an operator of the robotic system to a head input device, and receive foot input signals indicative of foot inputs provided by the operator of the robotic system to a foot input device. The plurality of machine-readable instructions, when executed, further cause the one or more processors to process the head input signals and the foot input signals, identify, based on the processed head and foot input signals, that the operator has provided a combination of head and foot inputs corresponding to a steerable viewer mode activation command, and cause the robotic system to enter the steerable viewer mode in response to identifying that the operator has provided the combination.

DETAILED DESCRIPTION

In one or more embodiments, systems and methods for activating a steerable viewer mode ("SVM") of a computer-assisted robotic system are presented. In one or more embodiments, the activation command may be performed by an operator's head and/or foot. In one or more embodiments supporting de-activation commands, the de-activation commands may also be performed by an operator's head and/or foot. In some embodiments, the activation and/or the de-activation command does not require any hand actions to be performed by the operator to either activate or de-activate the SVM. As noted above, a SVM of a computer-assisted robotic system allows the operator to move a tool (such as an imaging device) supported by the follower device through head inputs (such as head motion). For example, the operator may provide head inputs sensed by a head input sensor, such as a head input sensor integrated or physically coupled to a head rest of the steerable viewer.

Aspects of this disclosure are described in reference to computer-assisted systems and devices, which may include systems and devices that are teleoperated, remote-controlled, autonomous, semiautonomous, robotic, and/or the like. Further, aspects of this disclosure are described in terms of an embodiment using a surgical system, such as the da Vinci® Surgical System commercialized by Intuitive Surgical, Inc. of Sunnyvale, California. Knowledgeable persons will understand, however, that inventive aspects disclosed herein may be embodied and implemented in various ways, including robotic and, if applicable, non-robotic embodiments and embodiments. Embodiments described with reference to the da Vinci® Surgical System are merely exemplary and are not to be considered as limiting the scope of the inventive aspects disclosed herein. For example, techniques described with reference to surgical tools and surgical methods may be used in other contexts. Thus, the tools, systems, and methods described herein may be used for humans, animals, portions of human or animal anatomy, industrial systems, general robotic, or general teleoperated systems. As further examples, the tools, systems, and methods described herein may be used for non-medical purposes including industrial uses, general robotic uses, sensing or manipulating non-tissue work pieces, cosmetic improvements, imaging of human or animal anatomy, gathering data from human or animal anatomy, setting up or taking down systems, training medical or non-medical personnel, and/or the like. Additional example applications include use for procedures on tissue removed from human or animal anatomies (without return to a human or animal anatomy) and for procedures on human or animal cadavers. Further, these techniques can also be used for medical treatment or diagnosis procedures that include, or do not include, surgical aspects.

Figure 1:
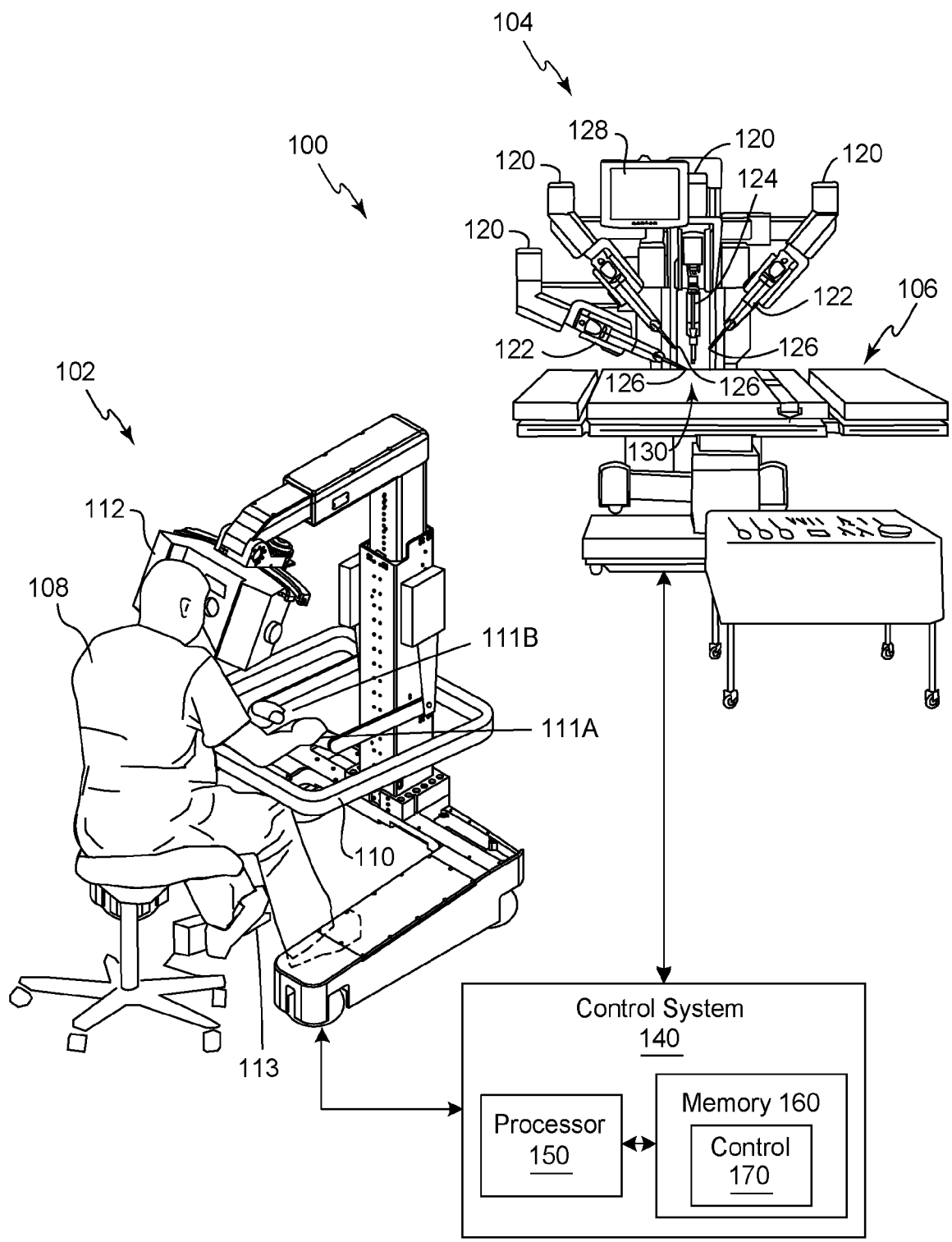
FIG. 1 is a simplified diagram of an example computer-assisted robotic system, according to various embodiments.

FIG. 1 is a simplified diagram of an example computer-assisted robotic system 100, according to various embodiments. In some examples, the computer-assisted robotic system 100 may be a teleoperated medical system. In some examples, the teleoperated medical system may be a surgical system. In some examples, the computer-assisted robotic system 100 may be operated in a leader-follower configuration. In a leader-follower configuration, the follower mimics part or all of the leader's motion. An operator can then use the input system of the leader device to teleoperate the follower device. The leader-follower configuration is often called a "master-slave" configuration, where the leader is the "master," and the follower is the "slave." In this computer-assisted robotic system 100 example, as shown in FIG. 1, the computer-assisted robotic system 100 may include a follower device 104 and a leader device (for example, comprising an input system 102) for commanding motion of the follower device 104. In the example of FIG. 1, the follower device 104 is shown as a manipulating device comprising a plurality of manipulator arms 120, and the input system 102 of the leader device is shown with a workstation also called "a console"). The follower device 104 and leader device may be in any appropriate form; for example, in various embodiments, the follower device 104 may comprise any appropriate tele-operable system, and the input system 102 of the leader device and may or may not include a workstation.

In this example, the input system 102 of the leader device includes one or more input devices which are manipulated by the hands of an operator 108. For example, the input system 102 may comprise one or more hand input devices 111A, 111B for use by one or more hands of the operator. The hand input devices 111A, 111B are supported by the input system 102 and may be mechanically grounded. Additionally, for example, the input system 102 may comprise one or more foot input devices 113 for use by one or more feet of the operator or. In various examples, an input device (111A, 111B, 113) is each usable by a single hand or foot, usable by or by multiple hands or feet simultaneously, and/or usable by multiple hands or feet in a time-multiplexed manner. Input devices (111A, 111B, 113) may each include, or be coupled mechanically, coupled electromagnetically, imageable by, or otherwise sensed by, one or more sensors (not shown) to detect operator interaction (e.g. application and release of foot input device 113). An ergonomic support 110 may be provided in some embodiments (e.g., a forearm rest on which the operator 108 may rest his or her forearms). In some examples, the operator 108 may perform tasks at a worksite near the follower device 104 during a procedure, for example a medical procedure, by commanding the follower device 104 using one or more of the input devices (111A, 111B, 113) of the leader device.

Continuing with reference to FIG. 1, a display unit 112 may be included in the example input system 102. The display unit 112 may display images for viewing by the operator 108. The display unit 112 may be moved in various degrees of freedom to accommodate the viewing position of the operator 108 and/or to provide control functions. In some examples, the display unit 112 accepts inputs from the operator 108 to command the computer assisted robotic system. For example, in some instances, the display unit 112 accepts head inputs from the operator 108 to command motion of the follower device 104, such that the display unit 112 is also a head input device of input system 102, and used in a leader-follower configuration.

In the example of the computer-assisted robotic system 100, the display unit 112 may display images depicting a worksite at which the operator is performing various tasks by manipulating the input devices (e.g. 111A, 111B, 113, and as appropriate display unit 112). In some examples, the images displayed by the display unit 112 may be received by the input system 102 from one or more imaging devices for capturing images acquired at the worksite. In other examples, the images displayed by the display unit may be generated by the display unit (or by another device or system communicatively coupled to the display unit), such as for virtual representations of tools, the worksite, user interface components, etc.

When using the input system 102, the operator 108 may sit in a chair, as shown, or on other support in front of the input system 102, position his or her eyes in front of the display unit 112, manipulate the input devices 111A, 111B, 113, and rest his or her forearms on the ergonomic support 110, as desired. In some embodiments, the operator 108 may stand at the input system 102 or assume other poses, and the display unit 112 and input devices 111A, 111B, 113 may be adjusted in position (height, depth, etc.) to accommodate the operator 108.

As noted above, the computer-assisted robotic system 100 may also include follower device 104, which may be commanded by the leader device (for example, commanded by the input system 102. In a medical example, the follower device 104 may be located near an operating table 106 (e.g., a table, bed, or other support) on which a patient may be positioned. In such cases, the worksite 130 may be provided on the operating table 106, (e.g., on or in a patient, simulated patient or model, etc. (not shown)). The example follower device 104 as shown includes a plurality of manipulator arms 120, each configured to couple to a tool assembly 122. The tool assembly 122 may include, for example, a tool 126 and a tool carriage (not shown) that is configured to hold the tool 126.

In various embodiments, one or more of the tools 126 may include an imaging device for capturing images (e.g., optical cameras, hyperspectral cameras, ultrasonic sensors, etc.). FIG. 1 shows an endoscope assembly 124 that includes an imaging device, which may provide captured images of a portion of the worksite to be displayed by the display unit 112 of the input system 102.

In some embodiments, the manipulator arms 120 and/or tool assemblies 122 may be controlled to move and articulate the tools 126 in response to manipulation of the hand input devices by the operator 108, so that the operator 108 may perform tasks at the worksite 130. In surgical examples, the operator 108 may direct the manipulator arms 120 to move tools 126 to perform surgical procedures at internal surgical sites through minimally invasive apertures or natural orifices.

As shown, a control system 140 is provided external to the input system 102 that communicates with the input system 102. In other embodiments, the control system 140 may be provided in input system 102 or in follower device 104. As the operator 108 moves input device(s) (for example hand input devices 111A, 111B, and as appropriate display unit 112) sensors sense spatial information, including sensed position and/or orientation information, and provides such spatial information to the control system 140 based on the movement of these input devices. The control system 140 may determine or provide control signals to the follower device 104 to control the movement of the arms 120, tool assemblies 122, and/or tools 126 based on the received information and user input. In one embodiment, the control system 140 supports one or more wired communication protocols, (e.g., Ethernet, USB, and/or the like) and/or one or more wireless communication protocols (e.g., Bluetooth, IrDA, HomeRF, IEEE 802.11, DECT, Wireless Telemetry, and/or the like).

The control system 140 may be implemented on one or more computing systems. One or more computing systems may be used to control the follower device 104. In addition, one or more computing systems may be used to control components of the input system 102, such as movement of a display unit 112 in response to movement of the head of the operator 108.

As shown, the control system 140 includes a processor 150 and a memory 160 storing a control module 170. In embodiments, the control system 140 may include one or more processors, non-persistent storage (e.g., volatile memory, such as random access memory (RAM), cache memory), persistent storage (e.g., a hard disk, an optical drive such as a compact disk (CD) drive or digital versatile disk (DVD) drive, a flash memory, etc.), a communication interface (e.g., Bluetooth interface, infrared interface, network interface, optical interface, etc.), and numerous other elements and functionalities. In addition, functionality of the control module 170 can be implemented in any technically feasible software and/or hardware.

In some embodiments, one or more hand or foot input devices 111A, 111B, 113 may be ungrounded (ungrounded input devices being not kinematically grounded, such as hand input devices held by the hands of the operator 108 without additional physical support). Such ungrounded input devices may be used in conjunction with the display unit 112. In some embodiments, the operator 108 may use a display unit 112 positioned near the worksite, such that the operator 108 may manually operate tools at the worksite, such as a laparoscopic tool in a surgical example, while viewing images displayed by the display unit 112.

Some embodiments may include one or more components of a computer-assisted robotic medical system such as a da Vinci® Surgical System, commercialized by Intuitive Surgical, Inc. of Sunnyvale, California, U.S.A. Embodiments on da Vinci® Surgical Systems are merely examples and are not to be considered as limiting the scope of the features disclosed herein. For example, different types of teleoperated systems having follower devices at worksites, as well as non-teleoperated systems, may make use of features described herein.

Figure 2:
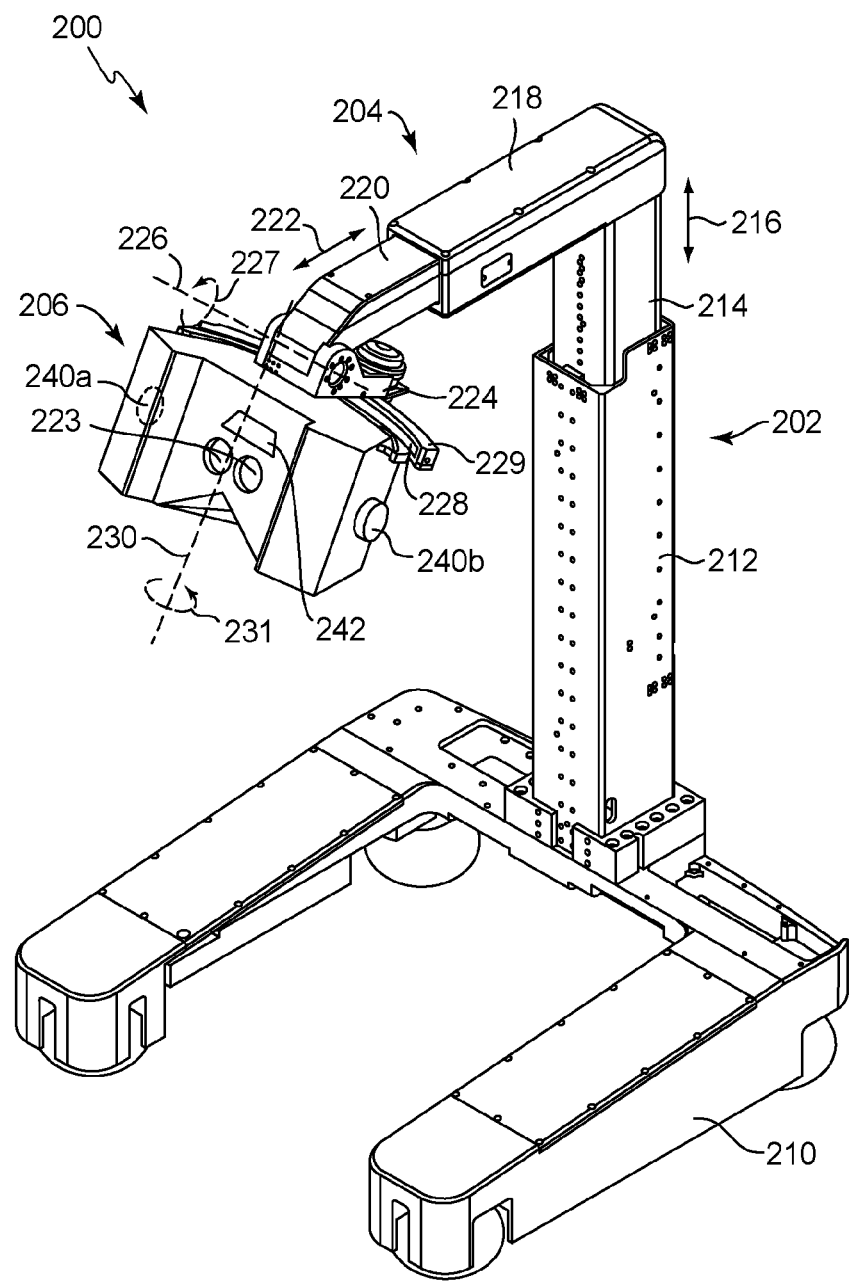
FIG. 2 is a perspective view of an example display system, in accordance with various embodiments.

FIG. 2 is a perspective view of an example display system 200, in accordance with various embodiments. In some embodiments, the display system 200 is used in a input system of a computer-assisted robotic system (e.g., in input system 102 of the computer-assisted robotic system 100 of FIG. 1). In alternate embodiments, the display system 200 may be used in other systems or as a standalone system, e.g., to allow an operator to view a worksite or other physical site, a displayed virtual environment, or the like. Although FIG. 2 shows a specific configuration, other embodiments may use different configurations.

The display system 200 includes a base support 202, an arm support 204, and a display unit 206. The display unit 206 is provided with multiple degrees of freedom of movement provided by a support linkage including the base support 202, the arm support 204 coupled to the base support 202, and a tilt member 224 (described more fully below)

coupled to the arm support 204. The display unit 206 is coupled to the tilt member 224.

The base support 202 may be a vertical member that is mechanically grounded, e.g., directly or indirectly coupled to ground, such as by resting or being attached to a floor. For example, the base support 202 may be mechanically coupled to a support structure 210 that is coupled to the ground. The base support 202 includes a first base portion 212 and a second base portion 214 coupled such that the second base portion 214 is translatable with respect to the first base portion 212 in a linear degree of freedom. In one example, as shown in FIG. 2, the second base portion 214 is configured to fit within first base portion 212, and to move up and down relative to it, along the degree of freedom 216, shown in FIG. 2 as generally a vertical direction.

The arm support 204 may be a horizontal member that is mechanically coupled to the base support 202. The arm support 204 may include a first arm portion 218 and a second arm portion 220. The second arm portion 220 is coupled to the first arm portion 218 such that the second arm portion 220 is linearly translatable in a first linear degree of freedom (DOF) with respect to the first arm portion 218. In one example, as shown in FIG. 2, the second arm portion 220 is configured to fit within first arm portion 218, and to move forwards and backwards relative to it, along the degree of freedom 222, shown in FIG. 2 as generally a horizontal direction.

The display unit 206 may be mechanically coupled to the arm support 204. The display unit 206 may be moveable in a second linear DOF provided by the linear translation of the second base portion 214 and second arm portion 220.

In some embodiments, the display unit 206 includes a display device, e.g., one or more display screens, projectors, or other display devices, that may display digital images. The display unit 206 may include two viewports 223, where the display device is provided behind or included in the viewports. One or more display screens or other display devices may be positioned on the display unit 206 in place of the viewports 223 in some embodiments.

In some embodiments, the display unit 206 displays images of a worksite (e.g., an interior anatomy of a patient in a medical example), captured by an imaging device such as an endoscope. The worksite may alternatively be a virtual representation of a worksite. The displayed images may show captured images or virtual renderings of tools 126 of the follower device 104 while one or more of these tools 126 are controlled by the operator via the input devices of the input system 102.

In some embodiments, the display unit 206 is rotationally coupled to the arm support 204 by a tilt member 224. In the illustrated example, the tilt member 224 is coupled at a first end to the second arm portion 220 of the arm support 204 by a rotary coupling configured to provide rotational motion of the tilt member 224 and the display unit 206 about the tilt axis 226 with respect to the second arm portion 220. In some embodiments, the tilt axis 226 is positioned above the display device in the display unit 206, as shown in FIG. 2.

Each of the various degrees of freedom discussed herein may be passive and require manual manipulation, or be movable by one or more actuators, such as by one or more motors, solenoids, etc. For example, the rotational motion of the tilt member 224 and the display unit 206 about the axis 226 may be driven by one or more actuators, such as by a motor coupled to the tilt member at or near the tilt axis 226.

The display unit 206 may be rotationally coupled to the tilt member 224 and may rotate about a yaw axis 230. For example, this may be lateral or left-right rotation from the point of view of an operator viewing images of the display unit 206 via the viewports 223. In this example, the display unit 206 is coupled to the tilt member by a rotary mechanism which may be a track mechanism. For example, in some embodiments, the track mechanism includes a curved track 228 that slidably engages a groove member 229 coupled to the tilt member 224, allowing the display unit 206 to rotate about the yaw axis 230 by moving the curved track 228 through a groove of the groove member 229.

The display system 200 may thus provide the display unit 206 with a vertical linear degree of freedom 216, a horizontal linear degree of freedom 222, a rotational (tilt) degree of freedom 227, and a rotational yaw degree of freedom 231. A combination of coordinated movement of components of the display system 200 in these degrees of freedom allow the display unit 206 to be positioned at various positions and orientations in its workspace. The motion of the display unit 206 in the tilt, horizontal, and vertical degrees of freedom allows the display unit 206 to stay close to, or maintain contact with, the head of the operator when the operator is providing head input(s) through head motion to the display system 200.

The degrees of freedom of the display system allow the display system 200 to provide pivoting motion of the display unit 206 in physical space about a pivot axis that may be positioned in different locations. For example, the display system 200 may provide motion of the display unit 206 in physical space that corresponds to motion of a head of an operator when operating the display system 200. This motion may include rotation about a defined neck pivot axis that approximately corresponds to a neck axis of the head of the operator at the neck of the operator. This rotation allows the display unit 206 to be moved in accordance with the head of the operator that is directing movement of the display unit 206. In another example, the motion may include rotation about a defined forehead pivot axis that approximately corresponds to a forehead axis extending through the head of the operator at the forehead when the display unit 206 is oriented, as shown, in a centered yaw rotary position about the yaw axis 230.

Display unit 206 may include one or more input devices that allow an operator to provide input to manipulate the orientation and/or position of the display unit 206 in space, and/or to manipulate other functions or components of the display system 200 and/or a larger system, e.g., a computer-assisted robotic system.

Illustratively, the display unit 206 includes a head input device 242. In some embodiments, the head input device 242 contains a portion positioned on a surface of the display unit 206 facing the head of the operator during operation of the display unit 206. Head input device 242 may contain a headrest portion for contacting the head of the operator.

The head input device 242 may be shaped to form a headrest which may be in contact with the head of the operator when the operator is providing head input. More specifically, the head input device 242 may be located in a region above the viewports 223 so as to be in contact with the forehead of the operator while the operator is viewing images through the viewports 223. The display unit 206 may include one or more head input sensors that sense operator head input to the head input device 242 as commands to cause movement of the imaging device, or otherwise cause updating the view in the images presented to the operator (such as by graphical rendering, digital zooming or panning, etc.). In some examples the head input sensors may be provided underneath head input device 242. In alternate examples, the head input sensors may be integrated within the head input device 242. Further, in some embodiments and some instances of operation, the sensed head movement is used to move the display unit 206 to compensate for the head movement. The position of the head of the operator may, thus, remain stationary relative to the viewports 223, even when the operator performs head movements to control the view provided by the imaging device. A proper alignment of the eyes of the operator with the viewports may thus be ensured.

In some embodiments, sensing the operator head input includes sensing a presence or contact by a head of an operator or by a portion of the head (e.g., forehead) with the head input device 242. The one or more head input sensors may include any of a variety of types of sensors, e.g., resistance sensors, capacitive sensors, force sensors, optical sensors, etc.

Continuing with reference to FIG. 2, the orientation and/or position of the display unit 206 may be changed by the display system 200 based on the operator head input to the head input device 242. For example, sensed operator input is provided to a control system (e.g., the control system 140 shown in FIG. 1), which controls actuators of the display system 200 to move the second base portion 214 in linear degree of freedom 216, the second arm portion 220 in linear degree of freedom 222, tilt member 224 in rotary degree of freedom 227, and/or display unit 206 in rotary degree of freedom 231, to cause the display unit 206 to be moved as commanded by (e.g., in accordance with) the sensed operator head input. Sensed operator head input may also be used to control other functions of the display system 200 and/or of a larger system (e.g., computer-assisted robotic system 100 of FIG. 1). Thus, in some embodiments, the operator may move his or her head to provide input to input device to control the display unit 206 to be moved by the display system 200 in accordance with the motion of the head, thus allowing the display unit 206 to follow motions of the head of the operator and changes in viewing angle.

In some embodiments, images displayed by the display unit 206, and/or other controlled devices, are changed and manipulated based on the sensed motion of the display unit 206.

In some embodiments of a display system, the display unit 206 is rotatable about yaw axis 230 in degree of freedom 231 and one or more of the other degrees of freedom 216, 222, and 227 are omitted from the display system 200. For example, the display unit 206 may be rotated about the yaw axis 230 (e.g., by actuator(s) and/or manually by an operator) and the display unit 206 may be manually positioned higher and/or lower (e.g., by actuator(s) and/or manually by an operator), e.g., using the base support 202 or other mechanism, where horizontal degree of freedom 222 and/or tilt degree of freedom 227 are omitted.

Those skilled in the art will appreciate that FIG. 2 merely shows an example for a configuration of a display system. Alternative configurations supporting movement of the display unit 206 based on an input from the operator are also possible. Any linkage that supports the desired movement of the display unit 206 may be used in lieu of the configuration shown in FIG. 2.

Although described herein primarily with respect to the display unit 206 that is part of a grounded mechanical structure (e.g., the display system 200), in other embodiments, the display unit may be any technically feasible display device or devices. For example, the display unit could be a handheld device, such as a tablet device or mobile phone, that is held by an operator. As another example, the display unit could be a head-mounted device (e.g., glasses, goggles, helmets). The position and/or orientation of the display unit may be determined using one or more accelerometers, gyroscopes, inertial measurement units, cameras, or other sensors internal or external to the display unit.

As described, a head input device in a display unit (e.g., the display unit 206) can include one or more head input sensors that sense operator head input that is converted to commands to cause movement of an imaging device, thereby updating the view in images captured by the imaging device and presented to the operator via the display unit. For example, the head input device in the display unit 206, can capture and convert head input provided by head forces or movements to commands for a tool which the imaging device (e.g. within endoscope assembly 124) is mounted. In the endoscope assembly 124 example, the endoscope assembly 124 may capture and provide images of a portion of a worksite that is displayed for output via the display unit 112 of the input system 102.

Figure 3:
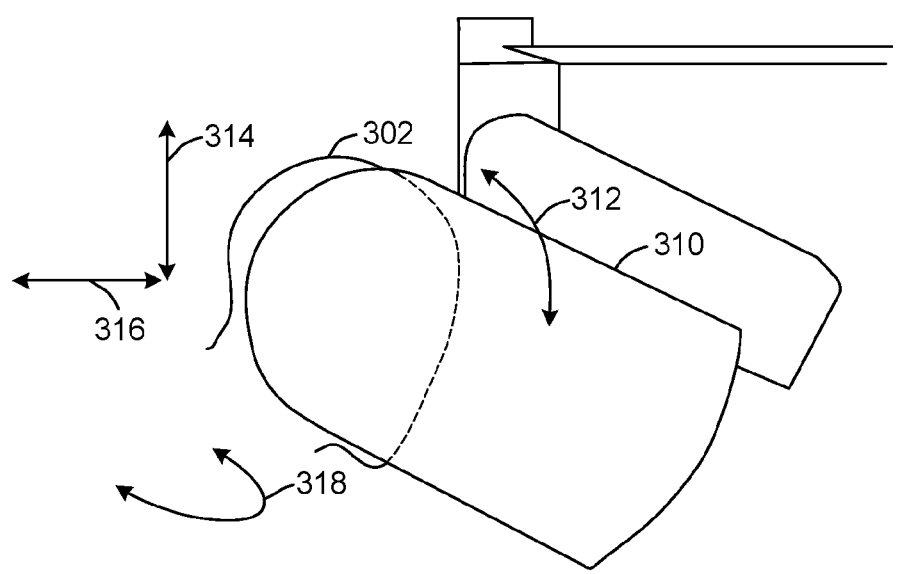
FIG. 3 illustrates different degrees of freedom of an example display unit, in accordance with various embodiments.

FIG. 3 illustrates degrees of freedom of an example display unit, in accordance with various examples. In various examples, a display unit, such as display system 200 of FIG. 2, may have different degrees of freedom than that of an imaging device, such as, for example, endoscope assembly 124 of FIG. 1, providing images to the display unit. With reference to FIG. 3, an example display unit 310 is illustrated, corresponding to the display unit 112 of FIG. 1 and the display unit 206 of FIG. 2, which includes four DOFs. In particular, an operator 302 can move the display unit 310 in the vertical (up and down) DOF 314 and in the horizontal (back and forth) DOF 316. The operator 302 can further rotate the display unit 310 to the left or right (yaw) DOF 318 and rotate the display unit 310 in the upward or downward (pitch) DOF 312. For example, as described above in conjunction with FIG. 2, the orientation and/or position of the display unit 206 may be changed based on operator head input to head input device 242 to manually move the display unit 206, or to control actuators of the display system 200 to move the display unit 206. For example, the manual or actuator-provided movement can follow the movement of the head of an operator by moving the second base portion 214 in linear degree of freedom 216, the second arm portion 220 in linear degree of freedom 222, the tilt member 224 in rotary degree of freedom 227, and/or the display unit 206 in rotary degree of freedom 231.

In some computer assisted robotic systems, there may be multiple operational modes for controlling an imaging device that is coupled to the follower device (e.g., follower device 104). In one operational mode, the imaging device may be controlled by the operator manipulating one or more hand input devices of the leader device (for example, hand input devices 111A and 111B of FIG. 1.) However, in this operational mode, the imaging device cannot easily be moved while both of the operator's hands are being used to operate other tools, such as, for example, in a surgical context, a tissue grasper and an ablation device. Accordingly, in an alternate operational mode, the operator controls the position of an imaging device by moving his or her head, thereby leaving his or her hands free to manipulate one or more tools coupled to the follower device. Because in the alternate operational mode it is desired to leave the operator's hands free, in some examples it is also desirable to activate and de-activate this alternate operational mode without requiring the operator to use his or her hands. This alternate operational mode is sometimes known as a "steerable viewer mode" ("SVM"), In some examples, a computer-assisted robotic system 100 may be configured to operate in either operational mode. In other examples, a computer-assisted robotic system 100 may be configured to operate in only the SVM. In either case, however, it is useful to enter and exit the SVM in a "hands free" manner.

Next described are various systems, methods and non-transitory machine-readable media for SVM activation and de-activation that may be implemented in a computer-assisted robotic system, such as, for example computer-assisted robotic system 100 of FIG. 1.

In one or more embodiments, the SVM may be activated by a head input that meets one or more predetermined criteria (a "pre-defined head input,") by a foot input that meets one or more predetermined criteria (a "pre-defined foot input,") or by a pre-defined combination of head and foot inputs, performed by an operator. Upon detecting such a pre-defined head input, foot input or combination head and foot input, the controller of the computer-assisted robotic system may activate the SVM. Similarly, once the SVM has been activated, the SVM may be de-activated by the system based on timeouts or other operation criteria, such as, for example, the operator performing a pre-defined head or foot input. The examples that follow focus on embodiments where the SVM is activated by a pre-defined combination of head and foot inputs. However, other embodiments may active SVM in response to head inputs only or with other inputs, foot inputs only or with other inputs, or some other combination of inputs.

As noted above, in one or more embodiments, the SVM may be activated by a pre-defined head input or by a pre-defined combination of head and foot inputs. Each of FIGS. 4-6, next described, illustrates an example head input that may be used to activate the SVM as the head input of a pre-defined combination of head and foot inputs. In one or more embodiments, a controller coupled to the input device receives signals from sensors respectively coupled to the head input device and the foot input devices, and processes the signals to detect a SVM activation command. In some examples, the controller may be control system 140 of FIG. 1.

Figure 4:
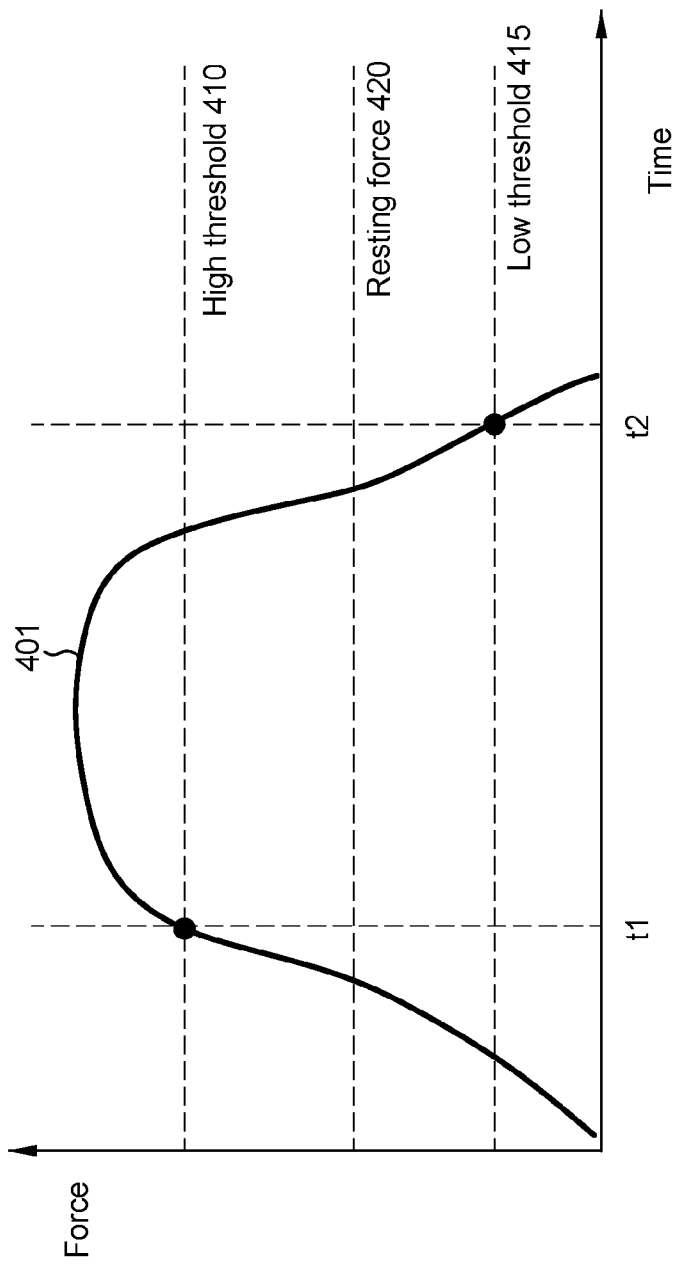
FIG. 4 is a plot of the magnitude of applied force versus time illustrating a force matching activation command, according to some embodiments.

FIG. 4 is a plot 401 of force magnitude applied to a head input device versus time. Plot 401 illustrates a "force matching" SVM activation command, according to some embodiments. In a force matching SVM activation command, an operator of the computer-assisted robotic system increases the magnitude of force that he or she applies to the headrest above a pre-defined threshold. The magnitude of the force at the pre-defined threshold is distinguishably higher than the magnitude of resting force usually applied by the operator to the headrest as he or she usually interacts with the display unit. The force magnitude illustrated in FIG. 4 (and in FIGS. 5 and 6 as well) may be sensed along a pre-defined direction. In one or more examples, the pre-defined direction may be a direction normal to an upper surface of the headrest. In other examples, the pre-defined direction may be a direction normal to yaw axis 230, as shown in FIG. 2. In still alternate examples, the pre-defined direction may be the direction of force usually applied by the operator's head when resting on the headrest. In some examples, if the operator applies the force along a different direction than the pre-defined direction, then the component of the applied force along the pre-defined direction may be used to determine whether the head input(s) meet the pre-defined criteria of the SVM activation command.

In still alternate examples, the input system may dynamically determine the direction at which a resting force is applied by the operator and set that as the pre-defined direction for identification of a subsequent SVM force matching activation command. Once a sensor of, or coupled to, the head input device detects a head input force greater than the predefined threshold, the head input is recognized as potentially being part of an SVM activation command. In order not to trigger an unwanted activation, as noted, the pre-defined threshold is higher than a standard resting force that the operator's head applies to the headrest in normal operation. Thus, with reference to FIG. 4, at a first time t1 the force magnitude applied by an operator's head to the head input device reaches a high threshold 410. Reaching the high threshold 410 is recognized as meeting a criterion for the head input portion of an SVM activation command comprising a combination of head and foot inputs. As shown in FIG. 4, the magnitude of the force at the high threshold 410 is significantly higher than the magnitude of the resting force 420, which is the force applied by an operator to the head input device, e.g., head input device 242 of FIG. 2, when normally operating the computer-assisted robotic system.

Continuing with reference to FIG. 4, there is also shown a low threshold 415 for force magnitude. In some embodiments, the operator may deactivate the SVM by momentarily reducing (e.g. partial reduction or entire removal of) the resting force 420 that he or she usually applies to the head input device so that the magnitude of the head input force drops to or below low threshold 415. The momentarily reduction by the operator of the resting force 420 to or below low threshold 415 is determined to be indicative of an intentional act to trigger the deactivation of the SVM. The momentarily reduction of the resting force 420 is shown at time t2 in FIG. 4. In some embodiments, high threshold 410 may be about 5 Newtons, and low threshold 415 may be about 1 Newton. In such embodiments, resting force 420 may be, for example from 2-3 Newtons.

Figure 5:
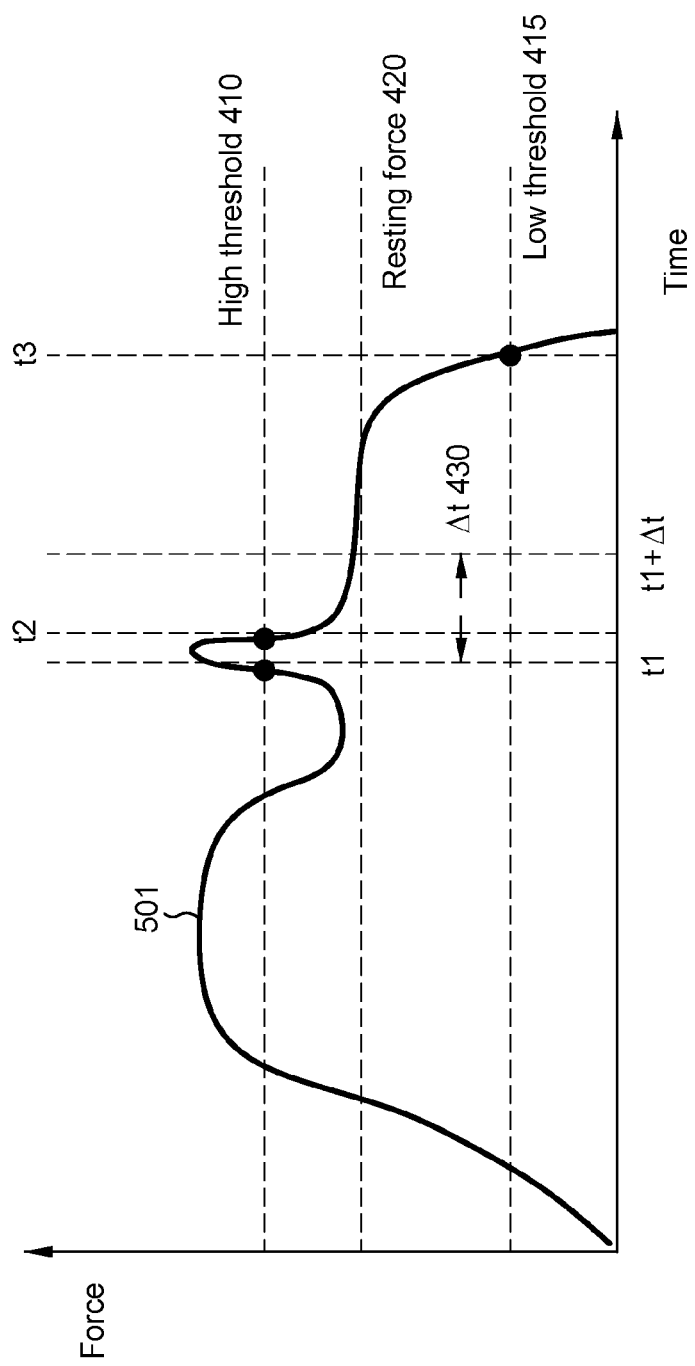
FIG. 5 is a plot of the magnitude of applied force versus time illustrating a sudden push activation command, according to some embodiments.

FIG. 5 illustrates an alternate head input portion meeting the criterion of an SVM activation command comprising a combination of head and foot inputs, according to some embodiments. Thus, FIG. 5 depicts a plot 501 of force magnitude versus time for what may be referred to as a "sudden push" SVM activation command. A sudden push command is not dependent upon simply exceeding a force magnitude threshold, in contrast to the example of FIG. 4. Rather, in a sudden push command, an operator has to apply a sudden push, similar to an abrupt increase and decrease of force magnitude applied to the headrest to activate the SVM. Thus, the sudden push may be characterized as a short pulse of force magnitude occurring within a very short pre-defined period of time. Use of this command allows the operator to rest on the headrest with whatever force he or she may desire without being worried about unintentionally activating the SVM, even if it exceeds a high threshold as illustrated in the example of FIG. 4. Thus, in order to trigger an SVM activation, the applied force magnitude should surpass a certain high threshold, in one example about 5N, and then drop back below that high threshold within a pre-defined short time interval. In one or more embodiments, the pre-defined short time interval may be set based on the application. Thus, for example, in a surgical application the pre-defined short time interval may differ from that in a recreation application, or from the pre-defined short time interval used in other non-surgical medical applications. In some examples the pre-defined short time interval may be set at 250 mS. In other examples the pre-defined short time interval may be set at a different time interval (e.g. longer or shorter time interval than 250 ms), as may be appropriate in a given application or design context. In one or more embodiments, deactivation of SVM that has been activated via the sudden push command may be indicated by an operator lowering the magnitude of the force that he or she applies to the head input device below a pre-defined threshold, in similar fashion as was described above with reference to the force matching command of FIG. 4.

Thus, as shown in the plot 501, at times prior to time t1, the magnitude of the force applied by the operator may be, in fact, above the high threshold 410. However, because there was no abrupt increase and decrease in the applied force relative to this high threshold 410, no activation command is detected, unlike the case of the force matching activation command illustrated in FIG. 4. However, beginning at time t1, the magnitude of the applied force reaches high threshold 410, rises above the high threshold 410, and then, at time t2, which is within the short time interval Δt 430 of t1, returns to the high threshold 410 and drops below it. The rising above and dropping below the high threshold 410, all within the short time interval Δt 430, is detected as an SVM activation command by the computer-assisted robotic system.

Finally, at time t3, the magnitude of the force applied by the operator to the head input device drops to the low threshold 415, and, in similar fashion to the example of FIG. 4, this is then detected as an SVM deactivation command, and a controller of the robotic system causes the robotic system to exit SVM at this point. In one example, the low threshold 415 is less than the magnitude of the resting force.

It is noted that in some examples the high threshold 410, resting force 420, and low threshold 415 of FIG. 5 may have the same values as they do in the example of FIG. 4, but this is not necessary, and they may also have different respective values.

Figure 6:
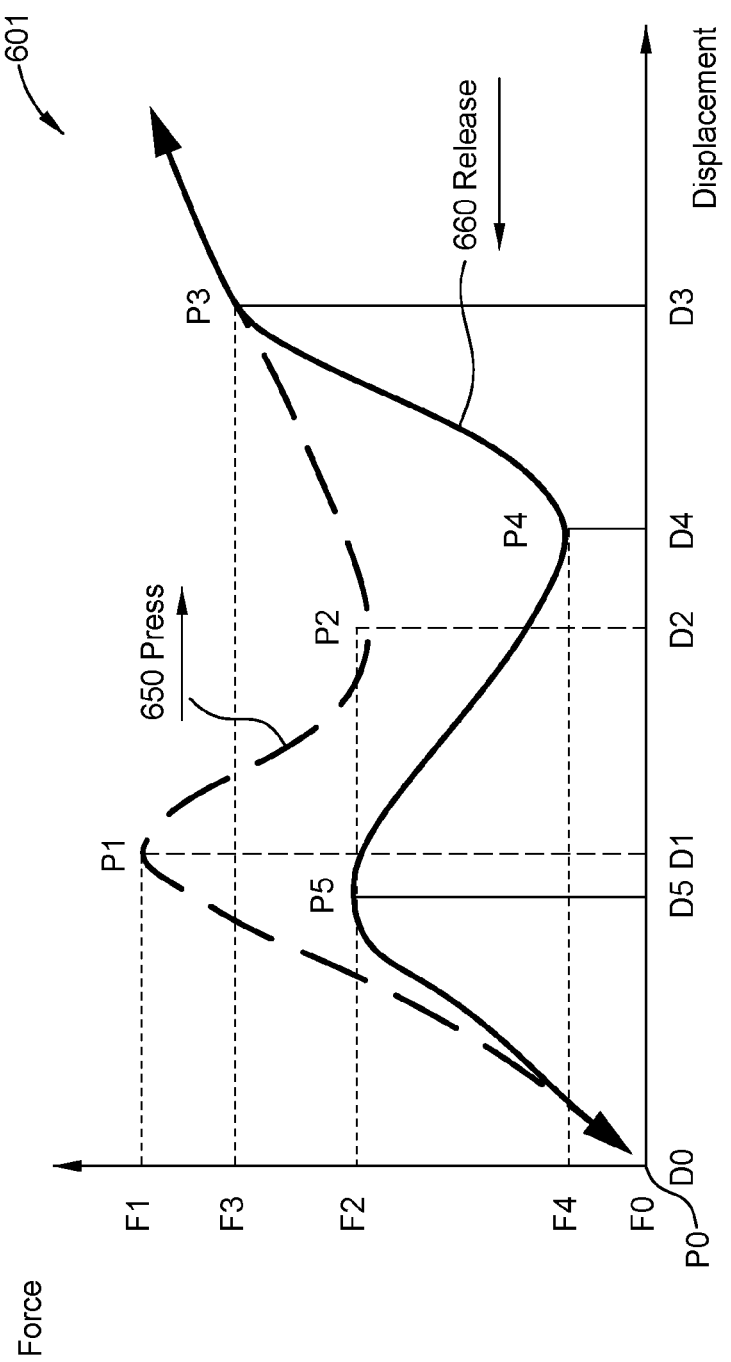
FIG. 6 is a plot of the magnitude of applied force versus time illustrating a tactile button activation command, according to some embodiments.

FIG. 6 illustrates a third alternate example head input meeting the criterion of an SVM activation command comprising a combination of head and foot inputs, according to some embodiments. FIG. 6 depicts a plot 601 of force magnitude applied to a head input device versus displacement. As noted above, in some examples the head input device may be a headrest. The depicted plot has two components, an initial "press phase" 650, shown as the upper dashed plot, with a local peak at P1, followed by a subsequent "release phase" 660, shown as the lower solid line plot, with a local valley at P4. This head input command, comprising the depicted combination of an initial overall increasing force that initially quickly rises and quickly falls (during the press phase 650), followed by a subsequent overall decreasing force that initially falls and then rises (during the release phase 660), may be known as a "tactile button" activation command. The tactile button activation command is designed to simulate the quick press followed by a quick release that one uses to interact with a clicking pen or click switch, where the moveable top of the pen or switch is biased by a spring toward a home position. However, in this example command it is the operator's head that performs the "clicking action" by pressing or pushing against the head input device.

In some examples, the tactile button activation command is facilitated by allowing a small pre-defined amount of displacement of the display unit in a direction normal to the head input device and away from the operator. This provides a tactile feedback that comprises an increasing resistance force with greater displacement, and simulates for the operator a spring-return force for head inputs pushing against the head input device. In this embodiment, the displacement away from the operator occurs in the press phase 650. Then, in the release phase 660, the display unit returns, partially or entirely, to its original position while providing further spring-emulating resistance force that pushes against the operator's head or not. For example, the resistance force may be momentarily changed (increased or decreased), and then returned to close to the previous force to simulate a "clicking" tactile feel by the operator through the head input device. In some examples, the display unit may actually displace, and in others it may not; in both cases, a resistance force pushing back against the operator's head may be changed. Actuators or brakes coupled to hold static or move the display unit can be used to provide the resistance force and response, The head input command is detected by a controller once the clicking action (which includes both the press and release phases of the tactile button command) is fully performed Continuing with reference to FIG. 6, there are several labeled points on the press phase 650, as well as on the release phase 660. These points, labeled P0 through P5, each have a displacement (D value) and a corresponding force magnitude (F value). Each of these points, indicate that the head input device is displaced to some extent D, and the operator applies a certain force magnitude F to the head input device. The displacement is measured at each of these points from an original position D0, shown at point P0, where a resting force F0 is applied by the operator, and there has been no displacement of the head input device or the display unit. In the press phase 650, illustrated in FIG. 6 by the dashed upper plot and beginning at point P0, the operator quickly increases the force magnitude that he or she applies to the head input device until a local maximum force magnitude F1 is applied at point P1. At P1, as shown, there is a displacement D1 from the initial position D0 of the head input device. From points P1 to P2, the operator decreases the applied force magnitude until a force magnitude F2 is applied at P2, where the displacement has increased to D2. F2 is lower than F1, as shown. Then, from point P2 to point P3, as the operator continues to displace the head input device with a more gradually increased applied force is more gradually increased until at point P3. P3 indicates that a force magnitude of F3 that is, which is less than the peak force F1, but greater than the force magnitude F2, is applied at a final displacement of D3. In the example of FIG. 6, P3 is the point at which the head input device is at its maximum forward displacement D3, and where the press phase 650 of the head input command is completed.

As noted with reference to the force matching SVM activation command described above with reference to FIG. 4, the force magnitudes illustrated in FIG. 6 may be sensed along a pre-defined direction. In one or more examples, the pre-defined direction may be, for example, a direction normal to an upper surface of the headrest. In other examples, the pre-defined direction may be a direction normal to yaw axis 230, as shown in FIG. 2. In still alternate examples, the pre-defined direction may be the direction of force usually applied by the operator's head when resting on the headrest, whatever that may be. In some examples, if the operator applies the force along a different direction than the pre-defined direction, then the component of the applied force along the pre-defined direction may be used to determine whether the head input(s) meet the pre-defined criteria of the SVM activation command.

Continuing with reference to FIG. 6, following the press phase 650, the system detects the operator performing the release phase 660 of the tactile button command, shown as the lower solid line plot in FIG. 6. The release phase 660 begins at point P3, where the head input device is at its maximum forward displacement D3, as described above. From point P3, there is a quick decrease of applied force to a local minimum at point P4, where the applied force magnitude is F4. After P4, there is a more gradual increase in applied force that is coupled with decreasing displacement, to the local maximum value of the release phase at point at P5. At point P5, the system detects that the operator is applying the same force magnitude F2 as was previously applied at point P2 during the press phase 650. As shown in FIG. 6, the displacement decreases along the release phase 660 as the head input device moves back towards its original position at point P0. The displacement D4 (at point P4) is less than displacement D3 (at point P3), and the displacement D5 (at point P5) is less than the displacement D1 (at point P1), for example. The system determines that the operator has completed the release phase 660 by detecting a decrease in the force magnitude below that of F4, at some point at or near point P0, as shown. In one or more embodiments, the force magnitude values at each of points P1, P2, P3, P4 and P5 may be chosen to shape the tactile feel of the initial force magnitude increase and decrease of the press phase 650, and the tactile feel of the force magnitude decrease and increase of the release phase 660. In the illustrated example release phase 660 of FIG. 6, the increase in applied force from F4 at P4 to F5 at P5 is more gradual than the decrease in applied force magnitude during the press phase 660 from F1 at P1 to F2 at P2. In other embodiments this may be changed. In still other embodiments the relative maximum at P5 need not be equal to the force magnitude applied at P2, and may thus be lower or higher, as may be appropriate to a given application or design.

In some examples, for the press phase 550, F1 may be 8 N, D1 may be 1.2 cm, F2 may be 4N, and D2 may be 1.5 cm. As additional examples, in the release phase 660, at F5 may be 4 N, D5 may be 1 cm, and D3 may be 2 cm. In other examples, different values of force magnitude and displacement may be used.

Thus, in the tactile button activation command, in the initial press phase 650 the operator is required to increase the applied force magnitude to a local maximum at a certain displacement D1. Once D1 is passed, the applied force required to further displace the head input device is reduced until the operator then reaches a second displacement D2. After reaching D2, the applied force required to further displace the head input device is increased, and a click-type force response is detected. In the release phase 660, the system applies less resistance force to the operator until a local minimum point is reached. After the local minimum point is reached, the system applies greater resistance force to the operator until the operator reaches a local maximum point. After this local maximum point is reached, the system reduces the resistance force, and then detects the completion of the activation command. As was the case for each of the "force matching" and "sudden push" example commands, deactivation of SVM after it has been activated by the tactile button command may be effected by the operator dropping the magnitude of the applied force below a low threshold force magnitude 415 as shown in FIGS. 4 and 5. In one or more examples, the low threshold force magnitude is less than the resting force F0 illustrated in FIG. 6.

As noted above, in one or more embodiments, the SVM may be activated by a pre-defined head input, by a pre-defined foot input, or by a pre-defined combination of head and foot inputs, performed by an operator. Upon detecting such a pre-defined head input, foot input or combination head and foot input, the controller of the computer-assisted robotic system may activate the SVM. The examples described above with reference to each of FIGS. 4-6 concern a pre-defined head input portion of such a combination head and foot input. In one or more embodiments a pre-defined foot portion of the combination of head and foot inputs may also be performed by an operator, and detected by a controller of the computer-assisted robotic system. In one or more embodiments, the head and foot inputs need to be provided by the operator within a pre-defined time of each other, but either input (e.g., head or foot) may be performed first, and either input may be performed last.

For example, the pre-defined foot input may be provided within a pre-defined time of a pre-defined head input that applies a contact force greater than a pre-defined minimum force, such as is illustrated in FIGS. 4 and 5. For example, the foot input may be applied to foot input device 113 of FIG. 1, and the foot input may be sensed by foot input device sensor(s), as described above. Alternatively, the foot input may include both an application of a force to the foot input device 113 and a subsequent removal of the force, both performed within a pre-defined time of one of the pre-defined head inputs described above. It is noted that in each of the example activation commands described with reference to FIGS. 4 and 5, the resting force, high threshold and low threshold, need not be absolute values, but may vary over time, over use, or among operators. Thus, in one or more embodiments, the computer-assisted robotic system, for example using the control system 140, may determine parameters for the combination of head and foot inputs based on an identity of the operator or a physical characteristic of the operator. In the first approach, the system may learn over time an operator's individual mean resting force, and may calibrate the high threshold and low threshold to that mean resting force. Or, for example, in the second approach, the system may vary the parameters for different operator height, weight, or body types, and when an individual operator interacts with the system, his or her parameter category may be determined, and then applied in processing his or her head and foot inputs. A similar parameterization may be performed for the values and relative values of forces at each of local peak X1, point X2, local valley Y1 and local peak Y2 of the example head input command illustrated in FIG. 6, whether by operator specific parameters, or whether by using a set of parameters for each of a corresponding set of categories of operator physical type, which categories may vary by height, weight and body type. In such embodiments, the high and low force values, as well as the requisite pre-defined displacement or pre-defined profile for a resisting force, may be varied or adjusted to fit the parameters determined to be applicable to a given operator.

As noted above, a force applied by an operator may be sensed along a pre-defined direction. In some examples the pre-defined direction may be a direction normal to either a surface of the head input device or a yaw axis, and thus be fixed relative to the display unit. Accordingly, in some embodiments, the computer-assisted robotic system may also use an orientation of the display unit to vary the pre-defined head input of the combination of head and foot inputs. The orientation of the display unit is used in this way as a proxy for the orientation of the head of an individual operator. For example, for the example head inputs illustrated in FIGS. 4 and 5, the computer-assisted robotic system may determine the direction of a force applied to the head input device by the operator, determine the component of that force along a pre-defined direction, and decrease the high threshold, low threshold and resting force values to match the ratio of the magnitude of the component along the normal direction to the overall magnitude of the force. In this manner, a force applied in a direction other than exactly the pre-defined direction along which the force magnitudes are sensed may still meet the requisite thresholds, and may thus be recognized as a valid SVM activation command.

Similarly, in one or more embodiments, a force applied by an operator to the head input device may be sensed relative to a given reference frame. For example, it may be a reference frame attached to the display unit. In that reference frame, the pre-defined direction along which the force is applied by the operator may not be purely along one of the axes of the reference frame. Thus, to account for that situation, and to recognize commands where the force is applied in a direction other than exactly the pre-defined direction, in one or more embodiments the applied force may be decomposed along the axes of the reference frame, and compared axis by axis. If a pre-defined magnitude along each axis is met or exceeded, the head input is recognized as valid.

In one or more embodiments, the computer-assisted robotic system may assist the operator in his or her attempts to accurately activate the SVM via visual indications. For example, in one or more embodiments the display unit 206, as shown in FIG. 2, may be further used to display a visual indication to the operator in response to the control system 140 (FIG. 1) identifying that the operator has either provided the pre-defined combination of head and foot inputs corresponding to a SVM activation command, or that the operator has provided a combination of head and foot inputs that are identified as a failed attempt at a SVM activation command. For example, the attempt may have failed due to force magnitudes not meeting a threshold, or, for example, the applied or removed force being along a direction too different than the pre-defined direction along which forces are sensed. In the former case, a visual indication that the SVM has been entered may be displayed. In the latter case, a visual indication advising that the system detects that an attempt to enter the SVM has been made by the operator, but that the command was not fully performed, and that the operator should try again.

Moreover, in one or more embodiments, even further detail may be displayed to the operator to guide him or her in accurately performing the requisite activation commands. Thus, for example, a visual indication may be displayed indicating a parameter of a head input contact force, the parameter being one of a magnitude of the head input contact force or a direction of the head input contact force. Or, for example, once a valid head input portion of a combination SVM activation command has been detected, the system may display a visual indication to the operator as to when to apply a foot input to the foot input device to complete the combination.

Figure 7:
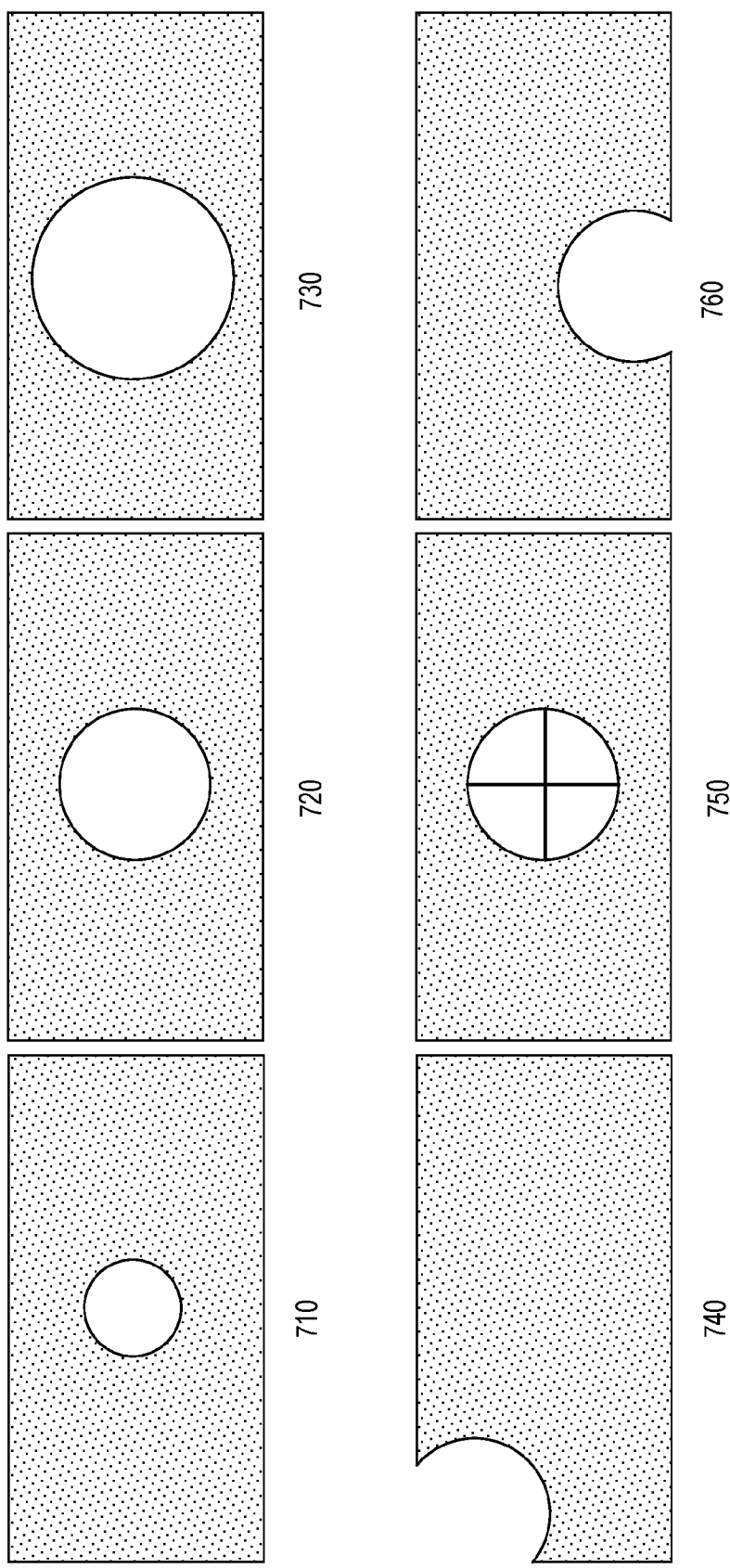
FIG. 7 illustrates an example visual indication to an operator according to some embodiments.

FIG. 7 illustrates example visual indications that may be displayed to guide an operator according to some embodiments. With reference thereto, FIG. 7 includes two rows of visual indications, the top row illustrating feedback as to a magnitude of sensed force applied to the head input device, and the bottom row illustrating feedback as to a location of sensed force applied to the head input device. For example, the operator may apply force to the head input device by pressing his or her forehead against a portion of the head input device (e.g. a headrest of the head input device). With reference to the upper row of FIG. 7, example visual feedback as to a magnitude of sensed force applied to the head input device is illustrated. Panels 710 through 730 illustrate that the size of the circle can be changed to indicate a magnitude of the applied force that has been sensed. The size of the circle can be have a linear or nonlinear, continuous or quantized, relationship to the magnitude. The magnitude can be the total magnitude, or the magnitude in a particular direction (e.g. a predefined direction used to qualify head inputs as a part of a SVM activation command). For example, if panel 720 contains a circle of a size that is at a force threshold that qualifies the head input as part of an SVM activation command, panel 710 indicates a head input that provides a magnitude of applied force that is too small, and panel 730 indicates a head input that provides a magnitude of applied force that exceeds the threshold. The feedback can be changed dynamically with the force input, such that the user can have usable feedback that helps them perform, or avoid, head inputs with force magnitude profiles for commanding activation or deactivation of SVM.

Similarly, the lower row of FIG. 7 illustrates example visual feedback as to a location of force applied by an operator. In panels 740 through 760, the position of the circle within the field is used to indicate a location at which the force is applied relative to a portion of the head input device. For example, some embodiments require that a force magnitude profile that qualifies as a SVM activation command be applied at a qualifying location on the head input device. An example qualifying location may be, for example, within some radius of a center of a headrest of the head, or at or near the center of the head input device The location of the circle can be have a linear or nonlinear, continuous or quantized, relationship to the actual location on the head input device. The feedback can be changed dynamically with the force input, such that the user can have usable feedback that helps them perform, or avoid, head inputs with force application locations for commanding activation or deactivation of SVM. In some embodiments, to qualify as a SVM activation command the location at which the force magnitude is applied may be required to be within some vertical distance of the center of the headrest of the head, but may applied anywhere on the headrest in terms of horizontal distance from the center. In other embodiments, the reverse may be the case, and the location at which the force magnitude is applied may be required to be within some horizontal distance of the center of the headrest of the head, but may applied anywhere on the headrest in terms of vertical distance from the center. In still other embodiments, both vertical and horizontal distance constraints may be imposed, and to qualify as a SVM activation command, the location at which the force magnitude is applied must be within pre-defined vertical and horizontal distances of the center of the headrest. For example, where the vertical and horizontal distances are equal in value, the location may be required to be within radius of a center of the headrest of the head.

FIG. 7 illustrates some specific examples of visual indicators using circles, rectangles, and crosses, various embodiments may provide visual indicators of various sizes, shapes, textures, colors, graphics and the like. In some embodiments, an arrow is rendered instead of, or in addition to, the circle, and directs the operator to move toward location(s) on the head input device that qualify the force applied as SVM mode commands. In some embodiments, instructional text is rendered instead of, or in addition to, the circle. In some embodiments, changes in color or in animation (e.g. flashing, etc.) help provide visual feedback indicating the magnitude, location, or some other aspect of the sensed force applied to the head input device.

As noted above, sensors in, or coupled to, the display unit may be used, in one or more embodiments, to sense the presence of an operator's head, and use that data as a prerequisite to executing any received operator commands. For example, the sensors may be provided underneath, or integrated in, the head input device of the display unit, or, for example, in other portions of the display unit, or both. The absence of a required state of the operator, e.g., the operator's head being at or within the display unit, is known as a "lockout condition." In one or more embodiments, even if a valid head input portion of an SVM activation command is identified, a controller of the computer-assisted robotic system may check for any lockout conditions prior to executing the operator command and activating the SVM, and only upon identifying a lack of lockout conditions, may actually cause the system to enter the SVM.

For example, the lockout conditions may include the operator's head being outside of a threshold proximity from the head input device. Or, for example, the lockout conditions may include the robotic system being in a fault mode, that no images of the worksite are being displayed for viewing by the operator, that no images are being provided by a specific imaging device, or some other condition that indicates that the system or the operator is not ready for teleoperation.

In the methods described herein, after activation of the SVM, the control system 140 may respond to further head inputs to the head input device provided while in the SVM in the following way. The control system 140 may pair the head input device with a follower device in a leader-follower configuration, such as by sending one or more control signals to command the follower device to move an imaging device supported by the follower device in a manner that partially or wholly mimics the motion of the head input device caused by the head inputs. (In contrast, if the operator has not provided a combination of head input(s) and foot input(s) corresponding to an SVM activation command, control system 140 would not pair the head input device with a follower device in a leader-follower configuration. Regardless of if the system is in SVM, control system 140 may command movement of an imaging device supported by the follower device in response to input by some input device aside from the head input device, in accordance with other criteria.

Further, in the methods described herein, after de-activation of the SVM, the control system 140 may unpair the head input device with the follower, such that further head inputs to the head input device no longer cause the control system to command the follower device to move an imaging device supported by the follower device in a manner that partially or wholly mimics the motion of the head input device. The control system 140 may or may not allow command movement of an imaging device supported by the follower device in response to input by an input device other than the head input device, in accordance with other criteria. Example input devices other than the head input device include input devices 111A, 111B, 113, or some other input device.

Figure 8:
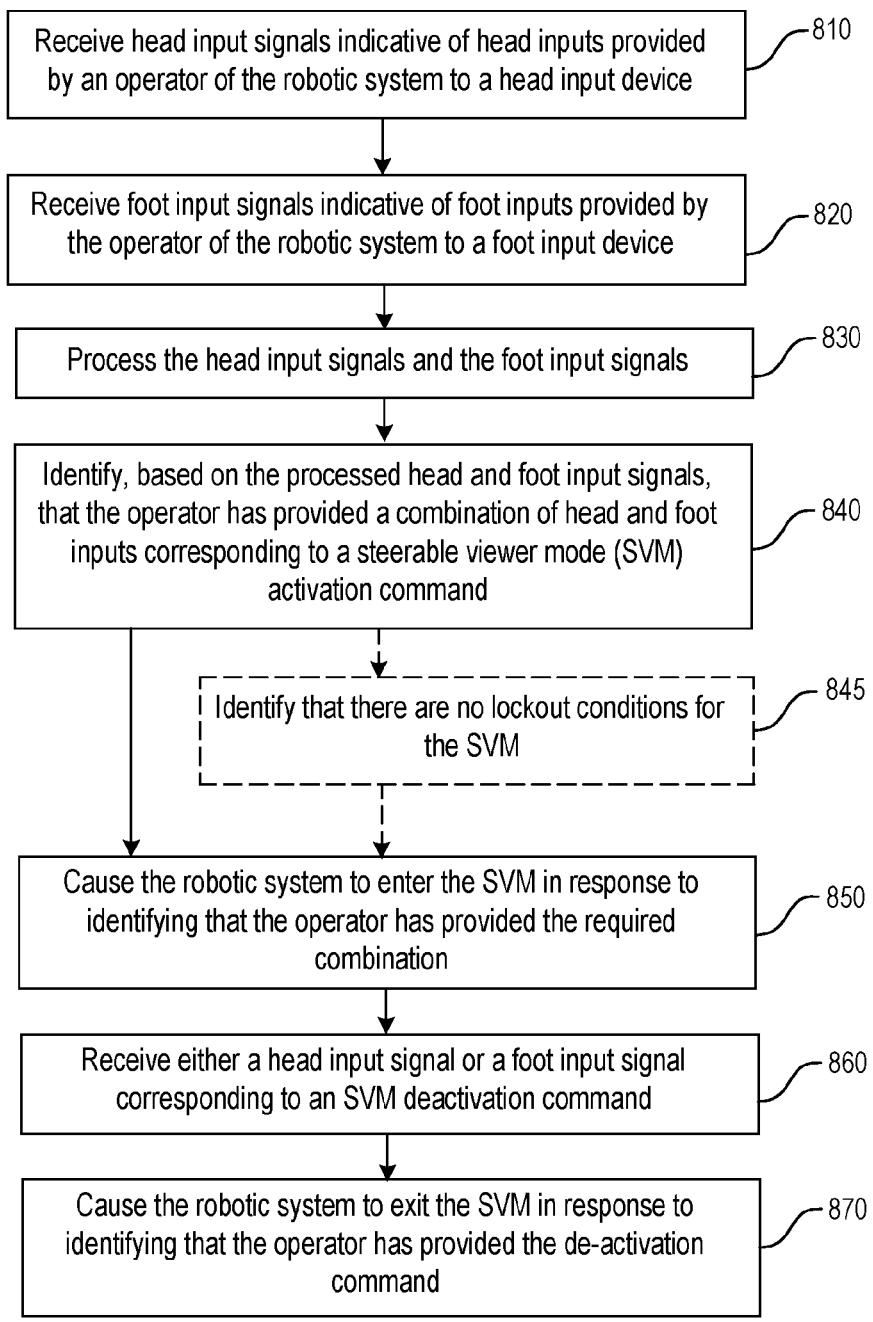
FIG. 8 is a flow diagram of a method for activating a steerable viewer mode of a computer-assisted robotic system, according to some embodiments.

FIG. 8 is a flow diagram of a method 800 for activating a steerable viewer mode of a computer-assisted robotic system, according to some embodiments. Method 800 includes blocks 810 through 870, with block 845 an optional block. In alternate examples, method 800 may include greater, or fewer, blocks. Method 800 may be performed by a controller of the computer-assisted robotic system, such as, for example, control system 140 of FIG. 1. Method 800 begins at block 810, where head input signals indicative of head inputs provided by an operator of the robotic system to a head input device are received. For example, with reference to FIG. 2, the head input signals may be generated by sensors coupled to, or integrated with, head input device 242, and other components of display unit 206, in response to an operator applying forces to the headrest, and may indicate any of the pre-defined head inputs of a combined SVM activation command as is illustrated in FIGS. 4-6 and described above.

From block 810 method 800 moves to block 820, where foot input signals indicative of foot inputs provided by the operator of the robotic system to a foot input device are received. For example, the foot input signals may be generated by foot input device sensors coupled to, or integrated within, input device 113, and may indicate an actuation of the foot input device 113 (e.g. depression of a foot pedal comprising the foot input device 113), or, for example, a first press and release of the foot input device 113, followed by a second press and release of the foot input device 113, within a pre-defined time.

From block 820 method 800 moves to block 830, where the head input signals and the foot input signals are processed. For example, these signals may be processed by control system 140 of FIG. 1.

From block 830 method 800 moves to block 840, where, based on the processed head and foot input signals, it is identified that the operator has provided a combination of head inputs and foot inputs corresponding to a steerable viewer mode activation command.

From block 840 method 800 may either move to optional block 845, or directly to block 850. If to optional block 845, at block 845 an additional check for no lockout conditions may be made. For example, the lockout conditions may be the operator's head being outside of a threshold proximity from the head input device, or, for example, the lockout conditions may include the robotic system being in a fault mode. Or, for example, the lockout condition may be, for example, that no images of the worksite are being displayed for viewing by the operator, or that no images are being provided by a specific imaging device, which negates entering SVM.

From either optional block 845, or from block 840, method 800 moves to block 850, where the robotic system is caused to enter the SVM in response to identifying that the operator has provided a combination of head input(s) and foot input(s) corresponding to an SVM activation command. With the entry into the SVM, method 800 may terminate at block 850. However, in some embodiments, method 800 may further include an SVM deactivation process. This is described with reference to blocks 860 and 870 of method 800.

Sometime following the entry into SVM at block 850, from block 850 method 800 moves to block 860, where either a head input signal or a foot input signal corresponding to an SVM deactivation command is received. For example, the deactivation command may include one or more signals received from the foot input device, or, for example, the operator decreasing the magnitude of the force he or she applies to the head input device below a low threshold, as described above.

From block 860 method 800 moves to block 870, where, in response to identifying that the operator has provided a valid de-activation command, the robotic system is caused to exit the SVM. Method 800 then terminates at block 870.

Figure 9:
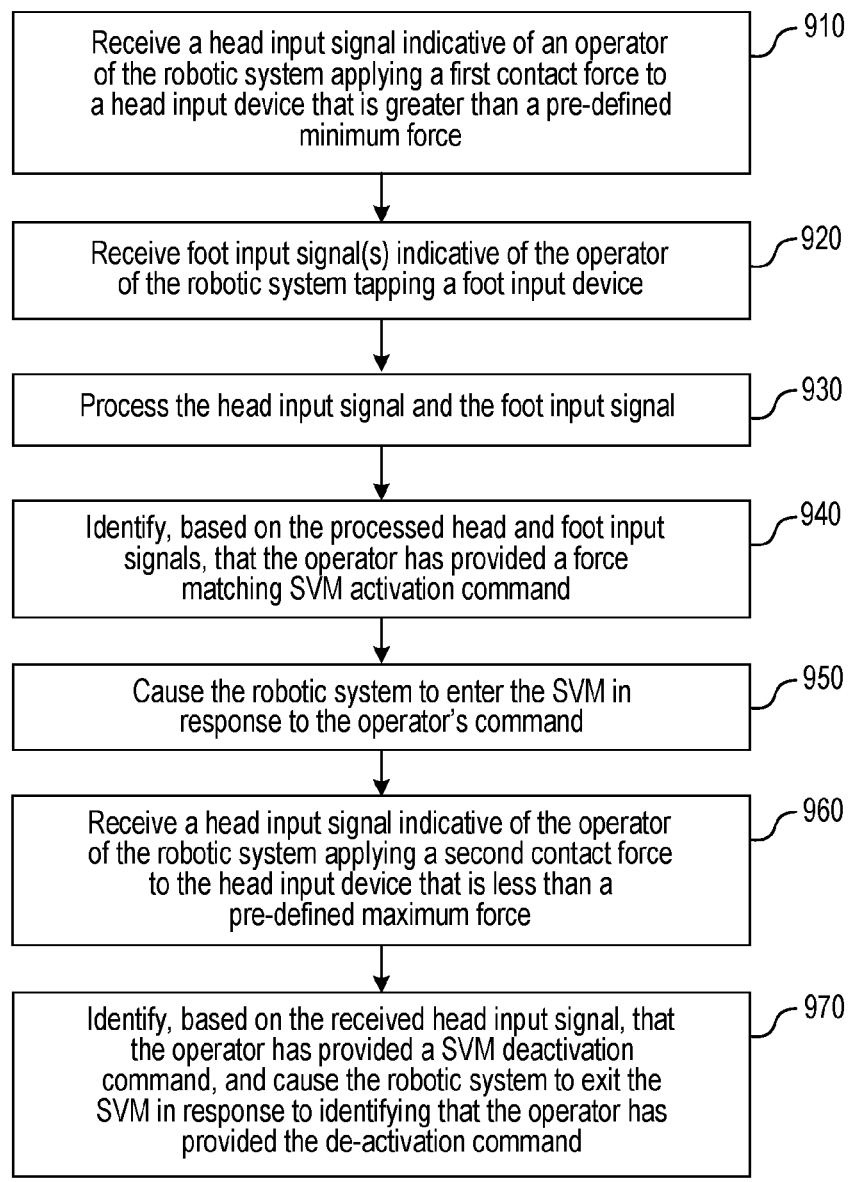
FIG. 9 is a flow diagram of a method for activating the steerable viewer mode of the computer-assisted robotic system for a first example combination of head and foot inputs.
Figure 10:
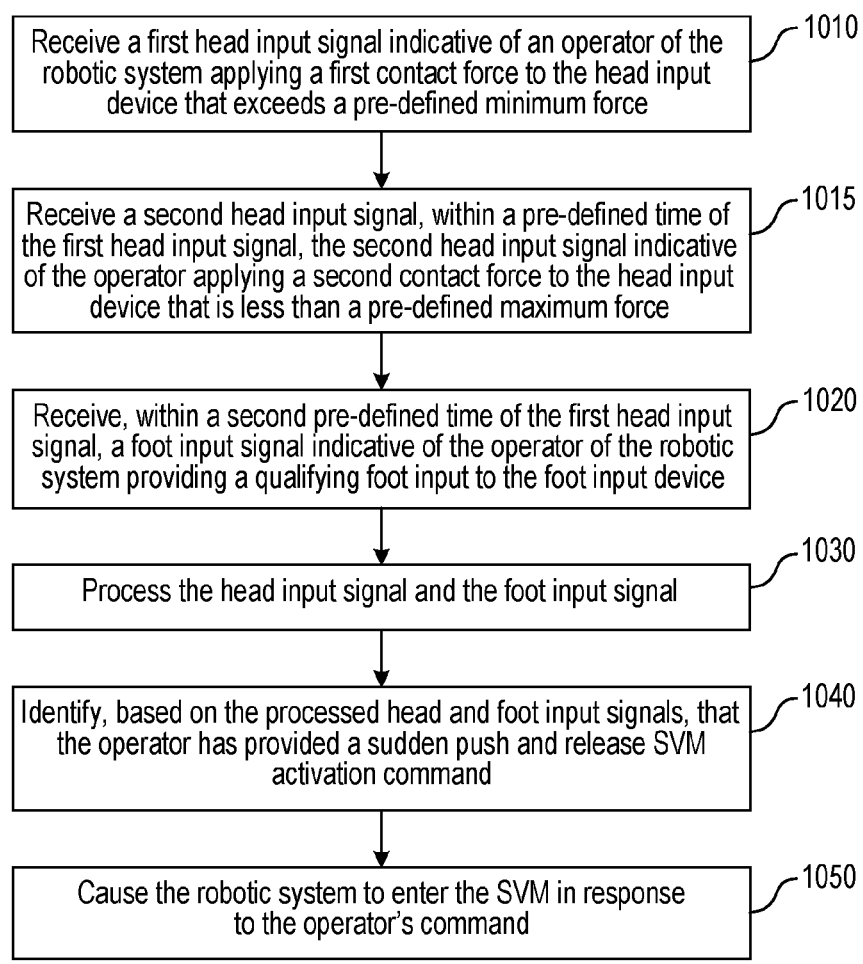
FIG. 10 is a flow diagram of a method for activating the steerable viewer mode of the computer-assisted robotic system for a second example combination of head and foot inputs.
Figure 11:
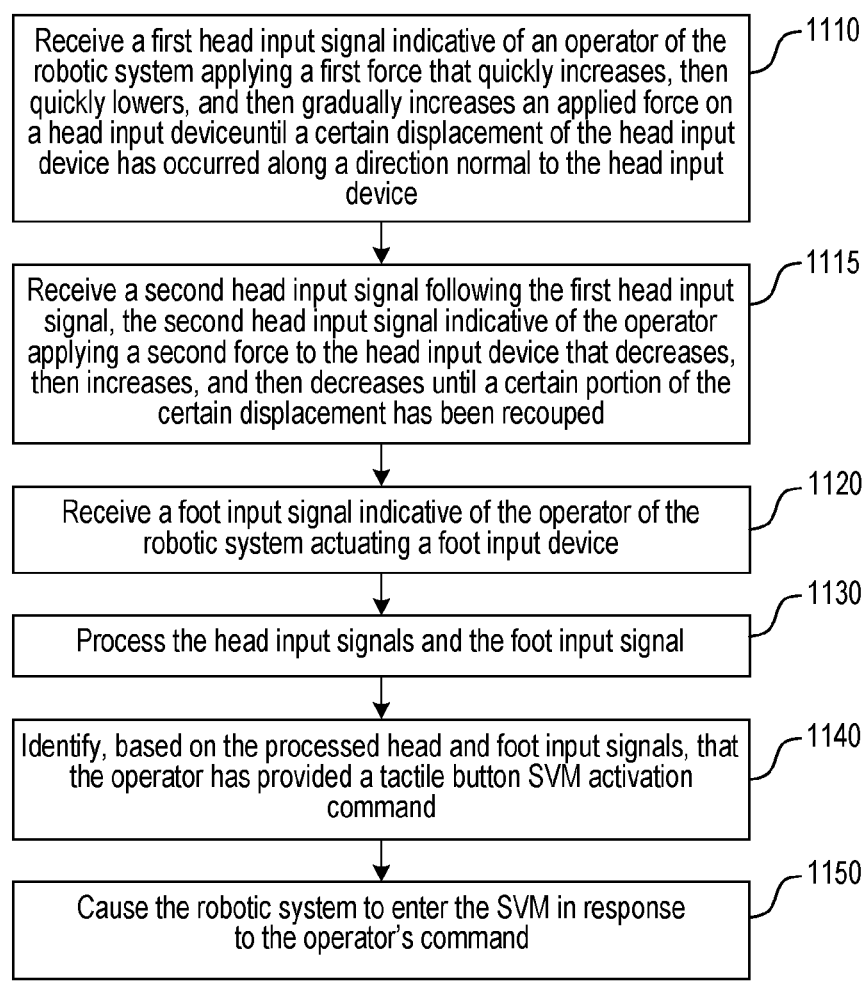
FIG. 11 is a flow diagram of a method for activating the steerable viewer mode of the computer-assisted robotic system for a third example combination of head and foot inputs.

FIGS. 9-11, next described, illustrate specific methods that reflect the respective pre-defined head inputs of combination head and foot input activation commands illustrated in each of FIGS. 4 through 6, described in detail above.

FIG. 9 is a flow diagram of a method 900 for activating the steerable viewer mode of the computer-assisted robotic system 100 of FIG. 1, for the example pre-defined head input known as force matching, illustrated in FIG. 4 and described above. Method 900 includes blocks 910 through 970. In alternate examples, method 900 may include greater, or fewer, blocks. Method 900 begins at block 910 where a head input signal is received indicative of an operator of the robotic system applying a first contact force to a head input device that is greater than a pre-defined minimum force. For example, with reference to FIG. 2, the head input signal may be generated by sensors coupled to, or provided in, head input device 242, in response to an operator applying a force to the head input device.

From block 910 method 900 moves to block 920, where one or more foot input signals are received that are indicative of pre-defined foot inputs provided by the operator of the robotic system to a foot input device. For example, the foot input signals may be generated by sensors coupled to, or provided in, foot input device 113 in response to an actuation of the foot input device 113. For example, the actuation may include a press and release of the foot input device, also referred to as a "single tap." Or, for example, the actuation may include a first press and release of the foot input device, followed by a second press and release of the foot input device, within a pre-defined time, also referred to as a "double tap." The foot input device may be foot input device 113 of FIG. 1, for example.

From block 920, method 900 moves to block 930, where the head input signal and the foot input signals are processed. For example, these signals may be processed by control system 140 of FIG. 1. From block 930, method 900 moves to block 940, where, based on the processed head input and foot input signals, it is identified that the operator has provided a force matching type SVM activation command.

From block 940, method 900 moves to block 950, where the robotic system is caused to enter the SVM in response to identifying that the operator has provided the combination corresponding to an SVM activation command. With the entry into SVM, method 900 may terminate at block 950. However, in some embodiments, method 900 may further include a de-activation process. This is described with reference to blocks 960 and 970 of method 900.

Sometime following the entry of SVM at block 950, method 900 moves to block 960, where a head input signal is received indicative of the operator of the robotic system applying a second contact force to the head input device that is less than a pre-defined maximum force. For example, the pre-defined maximum force may be the low threshold 415 illustrated in FIG. 4. A contact force applied to the head input device that is lower than low threshold 415 is an example de-activation command for the force matching example of FIG. 4.

From block 960, method 900 moves to block 970, where the received head input signal is identified as a valid SVM de-activation command, and in response to identifying that the operator has provided the valid SVM de-activation command, the robotic system is caused to exit the SVM. Method 900 then terminates at block 970.

FIG. 10 is a flow diagram of a method 1000 for activating the SVM of the computer-assisted robotic system 100 of FIG. 1, where the example pre-defined head input is the sudden push and release illustrated in FIG. 5 and described above. Method 1000 includes blocks 1010 through 1050. In alternate examples, method 1000 may include greater, or fewer, blocks. Method 1000 begins at block 1010 where a first head input signal is received indicative of an operator of the robotic system applying a first contact force to a head input device that exceeds a pre-defined minimum force. For example, with reference to FIG. 1, the head input signal may be generated by one or more sensors configured to sense input to a head input device in response to an operator applying a contact force to the head input device.

From block 1010, method 1000 moves to block 1015, where a second head input signal is received, within a pre-defined time of the first head input signal, the second head input signal indicative of the operator applying a second contact force to the head input device that is less than a pre-defined maximum force.

From block 1015, method 1000 moves to block 1020, where a foot input signal is received, within a second pre-defined time of the first head input signal. The foot input signal is indicative of the operator of the robotic system providing a foot input to the foot input device. For example, the foot input signal may be generated in response to the operator providing a qualifying foot input to the foot input device 113 of FIG. 1. In some examples, the qualifying foot input may be selected from the group consisting of: an application of input to the foot input device, a release of input to the foot input device, and an application followed by a release of input to the foot input device.

From block 1020, method 1000 moves to block 1030, where the head input signal and the foot input signal are processed. For example, these signals may be processed by control system 140 of FIG. 1.

From block 1030, method 1000 moves to block 1040, where, based on the processed head and foot input signals, it is identified that the operator has provided a valid sudden push and release type SVM activation command.

From block 1040, method 1000 moves to block 1050, where the robotic system is caused to enter the SVM in response to identifying that the operator has provided the combination corresponding to a valid SVM activation command. With the entry into SVM, method 1000 terminates at block 1050.

FIG. 11 is a flow diagram of a method 1100 for activating the SVM of the computer-assisted robotic system 100 of FIG. 1, for the example tactile button head input illustrated in FIG. 6 and described above. Method 1100 includes blocks 1110 through 1150. In alternate examples, method 1100 may include greater, or fewer, blocks. Method 1100 begins at block 1110 where a first head input signal is received that is indicative of an operator of the robotic system applying a first force to a head input device that quickly increases, then quickly lowers, and then gradually increases until a certain displacement of the head input device has occurred along a direction normal to the head input device.

From block 1110, method 1100 moves to block 1115, where a second head input signal is received, the second head input signal indicative of the operator applying a second force to a head input device that decreases, then increases, and then decreases until at least a certain portion of the certain displacement of block 1100 has been recouped. From block 1115, method 1100 moves to block 1120, where a foot input signal indicative of the operator of the robotic system actuating a foot input device is received.

From block 1120, method 1100 moves to block 1130, where the head input signals and the foot input signal are processed. For example, these signals may be processed by control system 140 of FIG. 1.

From block 1130, method 1100 moves to block 1140, where, based on the processed head and foot input signals, it is identified that the operator has provided a tactile button type SVM activation command.

From block 1140, method 1100 moves to block 1150, where the robotic system is caused to enter the SVM in response to identifying that the operator has provided the combination corresponding to a valid SVM tactile button type activation command. With the entry of the robotic system into SVM, method 1100 terminates at block 1150.

As described above with reference to FIGS. 9 and 10, once the computer-assisted robotic system is in SVM, the SVM may be de-activated by a simple command, which may include, for example, a press and release of the foot pedal, or, for example, as described above in connection with FIGS. 4-6, an input of a identifiably lesser force to the head input device than the resting force, such as a force less than low threshold 415 of FIG. 4. Sometimes, soon after de-activating the SVM, an operator wishes to re-enter SVM. In that case, if not too much time has passed from de-activation, the operator may be allowed to re-enter the SVM upon inputting an abbreviated command.

For example, such an abbreviated command may include any of the head input portions of the combined commands described above (without the additional foot input needed for a qualifying original SVM activation command), or, for example a simple foot input, such as a single tap (press and release), or a double tap, on a foot input device, e.g., a foot pedal. To facilitate this feature, a timer may be started every time that an operator de-activates the SVM, and, as long the abbreviated command is received before the timer times out, the computer-assisted robotic system is caused to re-enter the SVM. A method for such SVM re-activation is next described with reference to FIG. 12.

Figure 12:
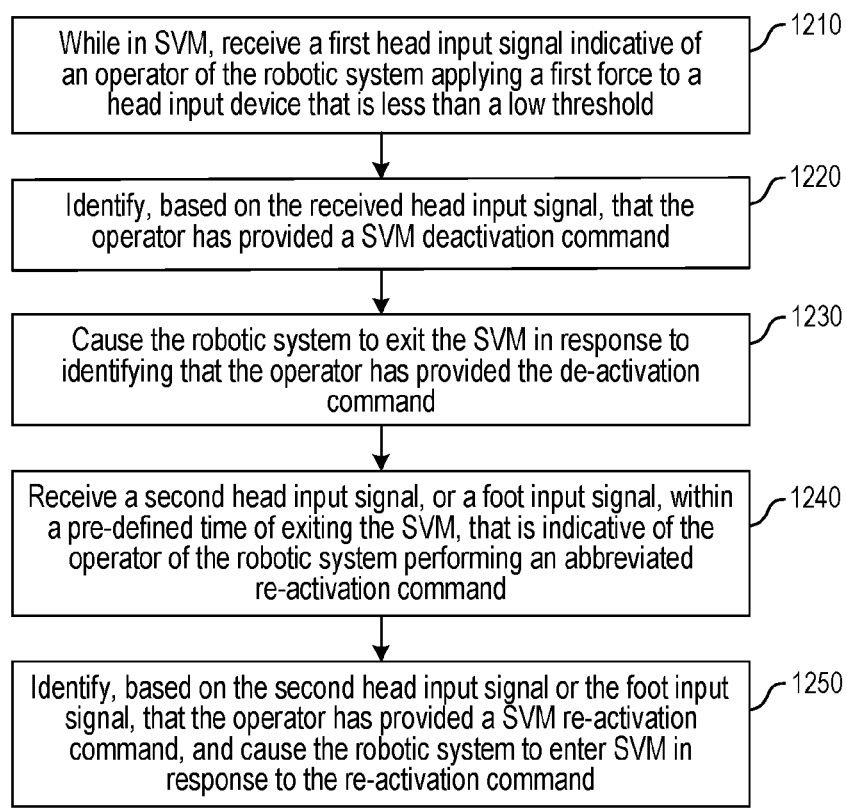
FIG. 12 is a flow diagram of a method for re-entering the steerable viewer mode of the computer-assisted robotic system within a pre-defined time from deactivation, in response to an abbreviated command.

FIG. 12 is a flow diagram of a method 1200 for re-entering the steerable viewer mode of the computer-assisted robotic system within a pre-defined time of a prior deactivation, using an abbreviated command. Method 1200 includes blocks 1210 through 1250. In alternate examples, method 1200 may include greater, or fewer, blocks.

Method 1200 begins at block 1210 where, while a computer-assisted robotic system is operating in SVM, a first head input signal is received, the first head input signal indicative of an operator of the robotic system applying a first force to a head input device that is less than a low threshold. For example, with reference to FIG. 2, the head input signal may be generated by sensors coupled to a head input device of display unit 206, in response to an operator applying a force to a head input device such as head input device 242.

From block 1210, method 1200 moves to block 1220, where, based on the received head input signal, it is identified that the operator has provided a SVM deactivation command. For example, with reference to FIG. 1, the head input signal may be processed by control system 140 and identified as the de-activation command.

From block 1220, method 1200 moves to block 1230, where the robotic system is caused to exit the SVM in response to identifying that the operator has provided a valid de-activation command. For example, control system 140 may stop commanding, in response to head inputs, the follower device to move an imaging device supported by the follower device. Depending on the configuration, the control system may command movement of the imaging device in response to input devices 111A and 111B, or some other input device, as opposed to moving in response to head inputs applied to the head input device.

From block 1230, method 1200 moves to block 1240, where a second head input signal or a foot input signal is received, within a pre-defined time of exiting the SVM at block 1230, the second head input signal or foot input signal indicative of the operator of the robotic system applying an abbreviated re-activation command. For example, the abbreviated command may comprise a second force to the head input device that is greater than a pre-defined minimum force, or, for example, a tap on the foot input device.

From block 1240, method 1200 moves to block 1250, where, based on the second head input signal, it is identified that the operator has provided a SVM re-activation command, such as, for example, an abbreviated version of the "force matching" command using just the pre-defined head input portion, or a tap on the foot input device. In response to the identification, the robotic system is caused to re-enter the SVM in response to the re-activation command.

While the foregoing is directed to embodiments of the present invention, other and further embodiments of the invention may be devised without departing from the basic scope thereof, and the scope thereof is determined by the claims that follow.

What is claimed is:

1. A computer-assisted robotic system comprising:
   a head input device configured to receive head inputs provided by a head of an operator of the robotic system, the head input device comprising one or more head input sensors configured to provide head input signals indicative of the head inputs;
   a foot input device configured to receive foot inputs provided by a foot of the operator of the robotic system, the foot input device comprising one or more foot input sensors configured to provide foot input signals indicative of the foot inputs; and
   a controller communicatively coupled to the head input device and the foot input device, the controller configured to:
   process first head input signals from the one or more head input sensors and first foot input signals from the one or more foot input sensors;
   identify, based on the processed first head and foot input signals, that the operator has provided a command to activate a steerable viewer mode, wherein a tool supported by the robotic system is not moved and an imaging device view displayed by the robotic system is not modified in response to the first head input signals and the first foot input signals; and
   cause the robotic system to enter the steerable viewer mode in response to identifying that the operator has provided the command, wherein in the steerable viewer mode, the robotic system causes motion of the tool in response to second head input signals from the one or more head input sensors, the second head input signals different from the first head input signals and indicative of additional head inputs provided by the head, and wherein the tool is supported by the robotic system.

2. The computer-assisted robotic system of claim 1, wherein the first head input signals indicate a head input having a contact force greater than a pre-defined minimum force, the pre-defined minimum force being greater than a head resting force.

3. The computer-assisted robotic system of claim 1, wherein:
   the first head input signals indicate a head input having a contact force greater than a pre-defined minimum force; and
   the first foot input signals indicate a foot input occurring within a pre-defined time of the head input having the contact force greater than the pre-defined minimum force, the foot input selected from the group consisting of:
   an application of input to the foot input device;
   a release of input to the foot input device; and an application followed by a release of input to the foot input device.

4. The computer-assisted robotic system of claim 1, wherein the first head input signals indicate:
   a first head input having a first contact force, the first contact force greater than a pre-defined minimum force; and
   a second head input having a second contact force, the second head input applied within a pre-defined time after the first head input, the second contact force less than a pre-defined maximum force.

5. The computer-assisted robotic system of claim 4, wherein the first foot input signals indicate a foot input provided within a second pre-defined time of the first head input, the foot input selected from the group consisting of:
   an application of input to the foot input device;
   a release of input to the foot input device; and
   an application followed by a release of input to the foot input device.

6. The computer-assisted robotic system of claim 1, further comprising:
   a biasing component, wherein the head input device is configured to be moved by the head along a direction normal to the head input device against a restoring force provided by the biasing component, wherein the restoring force operates to move the head input device along an anti-normal direction, and
   wherein the first head input signals indicate a head input that: increases at a first rate, then lowers at a second rate, and then increases an applied force on the head input device at a third rate slower than the first rate and the second rate until a certain displacement of the head input device has occurred along the direction.

7. The computer-assisted robotic system of claim 1, wherein the first head and foot input signals indicate:
   a first head input including a first contact force having components in multiple dimensions, each component of the first contact force greater than a respective pre-defined minimum value; and
   a second head input including a second contact force having components in multiple dimensions and applied within a pre-defined time of the first head input, each component of the second contact force less than a respective pre-defined maximum value.

8. The computer-assisted robotic system of claim 1, wherein causing the robotic system to enter the steerable viewer mode is further in response to:
   identifying a lack of lockout conditions for the steerable viewer mode.

9. The computer-assisted robotic system of claim 8, wherein the lockout conditions comprise the head being outside of a threshold proximity from the head input device.

10. The computer-assisted robotic system of claim 8, wherein the lockout conditions comprise a condition selected from the group consisting of: the robotic system being in a fault mode, no images of a workspace being displayed for viewing by the operator, and no real-time images being generated.

11. The computer-assisted robotic system of claim 1, further comprising a display device configured to display images to the operator, and wherein the controller is further configured to cause the display device to display a visual indication to the operator, the visual indication indicating:
   a parameter of a head input contact force, the parameter selected from the group consisting of a magnitude of the head input contact force and a direction of the head input contact force; or
   when to apply a foot input to the foot input device to provide the steerable viewer mode activation command.

12. The computer-assisted robotic system of claim 1, wherein the controller is further configured to:
   within a pre-defined time after exiting the steerable viewer mode, cause the robotic system to re-enter the steerable viewer mode upon identifying an abbreviated command.

13. The computer-assisted robotic system of claim 1, wherein the controller is further configured to cause the robotic system to exit the steerable viewer mode in response to identifying a subsequent head input having a force less than a pre-defined deactivation force.

14. The computer-assisted robotic system of claim 1, wherein the controller is further configured to determine parameters for the head and foot inputs indicated by the first head input signals and first foot input signals, based on an identity of the operator or a physical characteristic of the operator.

15. The computer-assisted robotic system of claim 1, wherein identifying that the operator has provided the steerable viewer mode activation command is further based on an orientation of the head of the operator.

16. A method for operating a robotic system, comprising:
   receiving head input signals indicative of head inputs provided by an operator of the robotic system to a head input device;
   receiving foot input signals indicative of foot inputs provided by the operator of the robotic system to a foot input device;
   processing the head input signals and the foot input signals;
   identifying, based on the processed head and foot input signals, that the operator has provided a command to activate a steerable viewer mode using a combination of head and foot inputs, wherein a tool supported by the robotic system is not moved and an imaging device view displayed by the robotic system is not modified in response to the combination of head and foot inputs; and
   causing the robotic system to enter the steerable viewer mode in response to identifying that the operator has provided the command.

17. The method of claim 16, wherein:
   the combination of head and foot inputs includes:
      a head input having a contact force greater than a pre-defined minimum force; or
   the combination of head and foot inputs includes:
      a first head input having a first contact force, the first contact force greater than a pre-defined minimum force, and
      a second head input having a second contact force, the second head input applied within a pre-defined time after the first head input, the second contact force less than a pre-defined maximum force; or
   the combination of head and foot inputs comprises a head input with an applied force on the head input device having a force magnitude profile that:
      in a press phase: increases from a first value to a local maximum value at a first rate, then lowers from the local maximum value at a second rate, and then increases to a second value at a third rate slower than the first rate and the second rate, the second value higher than the first value; and
      in a release phase: further decreases from the second value to a local minimum value, then increases from the local minimum value, and then decreases to or below a third value, the third value higher than the first value and lower than the second value and the local minimum value.

18. The method of claim 16, wherein causing the robotic system to enter the steerable viewer mode is further in response to:
identifying a lack of lockout conditions for the steerable viewer mode.

19. The method of claim 16, further comprising:
causing the robotic system to re-enter the steerable viewer mode upon identifying an abbreviated command within a pre-defined time after exiting the steerable viewer mode.

20. The method of claim 16, further comprising:
determining parameters for the combination of head and foot inputs based on an identity of the operator or a physical characteristic of the operator.

21. A non-transitory machine-readable medium comprising a plurality of machine-readable instructions that, when executed by one or more processors associated with a robotic system, cause the one or more processors to:
receive head input signals indicative of head inputs provided by an operator of the robotic system to a head input device;
receive foot input signals indicative of foot inputs provided by the operator of the robotic system to a foot input device;
process the head input signals and the foot input signals;
identify, based on the processed head and foot input signals, that the operator has provided a command to activate a steerable viewer mode using a combination of head and foot inputs, wherein a tool supported by the robotic system is not moved and an imaging device view displayed by the robotic system is not modified in response to the combination of head and foot inputs; and
cause the robotic system to enter the steerable viewer mode in response to identifying that the operator has provided the command.

22. The non-transitory machine-readable medium of claim 21, wherein causing the robotic system to enter the steerable viewer mode is further in response to:
identifying a lack of lockout conditions for the steerable viewer mode.

23. The non-transitory machine-readable medium of claim 21, wherein the instructions further cause the processor to:
determine parameters for the combination of head and foot inputs based on an identity of the operator or a physical characteristic of the operator.

* * * * *